United States Patent [19]
Iitsuka et al.

[11] Patent Number: 5,230,050
[45] Date of Patent: Jul. 20, 1993

[54] METHOD OF RECOMPILING A PROGRAM BY USING RESULT OF PREVIOUS COMPILATION

[75] Inventors: Takayoshi Iitsuka, Hachioji; Sumio Kikuchi, Machida, both of Japan

[73] Assignee: Hitachi, Ltd., Tokyo, Japan

[21] Appl. No.: 475,357

[22] Filed: Feb. 5, 1990

[30] Foreign Application Priority Data

Feb. 6, 1989 [JP] Japan .................. 1-25771

[51] Int. Cl.$^5$ ............................... G06F 9/06
[52] U.S. Cl. ..................... 395/700; 364/DIG. 1; 364/280.4
[58] Field of Search ............ 364/200 MS, 900 MS; 395/700

[56] References Cited

U.S. PATENT DOCUMENTS

| | | | |
|---|---|---|---|
| 4,330,822 | 5/1982 | Dodson | 364/200 |
| 4,435,753 | 3/1984 | Rizzi | 364/200 |
| 4,558,413 | 12/1985 | Schmidt et al. | 364/200 X |
| 4,667,290 | 5/1987 | Goss et al. | 364/200 |

OTHER PUBLICATIONS

"Interprocedural Optimization: Eliminating Unnecessary Recompilation," Cooper et al. ACM-Proceedings of the SIGPLAN '86 Symposium, vol. 21, No. 7 Jul. 1986 pp. 58-67.

"Make-A Program for Maintaining Computer Programs" Feldman, Software-Practice and Experience, vol. 9, 1979, pp. 255-265.

"Incremental Compilation in Magpie," Schwartz et al., Proceedings of the SIGPLAN '84 Symposium, SIGPLAN Notice vol. 19, No. 6, Jun. 1984, p. 122-131.

Primary Examiner—Thomas M. Heckler
Attorney, Agent, or Firm—Antonelli, Terry, Stout & Kraus

[57] ABSTRACT

A program compiling method in which a procedure being compiled is split into a plurality of units referred to as segments, whereon optimization is carried out for each of the segments. Upon recompilation of the procedure, optimization of the procedure is redone not for the whole of the procedure but executed only on the segments which are affected by modification, while for the segments insusceptible to the influence of modification, object program obtained by the compilation or the intermediate codes available in the course of the optimization are reused. At several stages of optimization, intermediate results of the optimization are recorded, wherein upon recompilation, the intermediate results of optimization obtained in the preceding compilation are made use of up to the stage where no influence of modification makes appearance. The amount of processing involved in the optimization can thus be reduced even when the object program can not be utilized. In a mode for carrying out the invention, not only the interim results of optimization but also the contents of optimization executed are recorded. Upon recompilation, those of the optimization processings executed in the preceding compilation which are to be executed again can be performed rapidly by making use of the contents stored. The time taken for the execution of optimization processing to be re-executed can be reduced significantly.

20 Claims, 30 Drawing Sheets

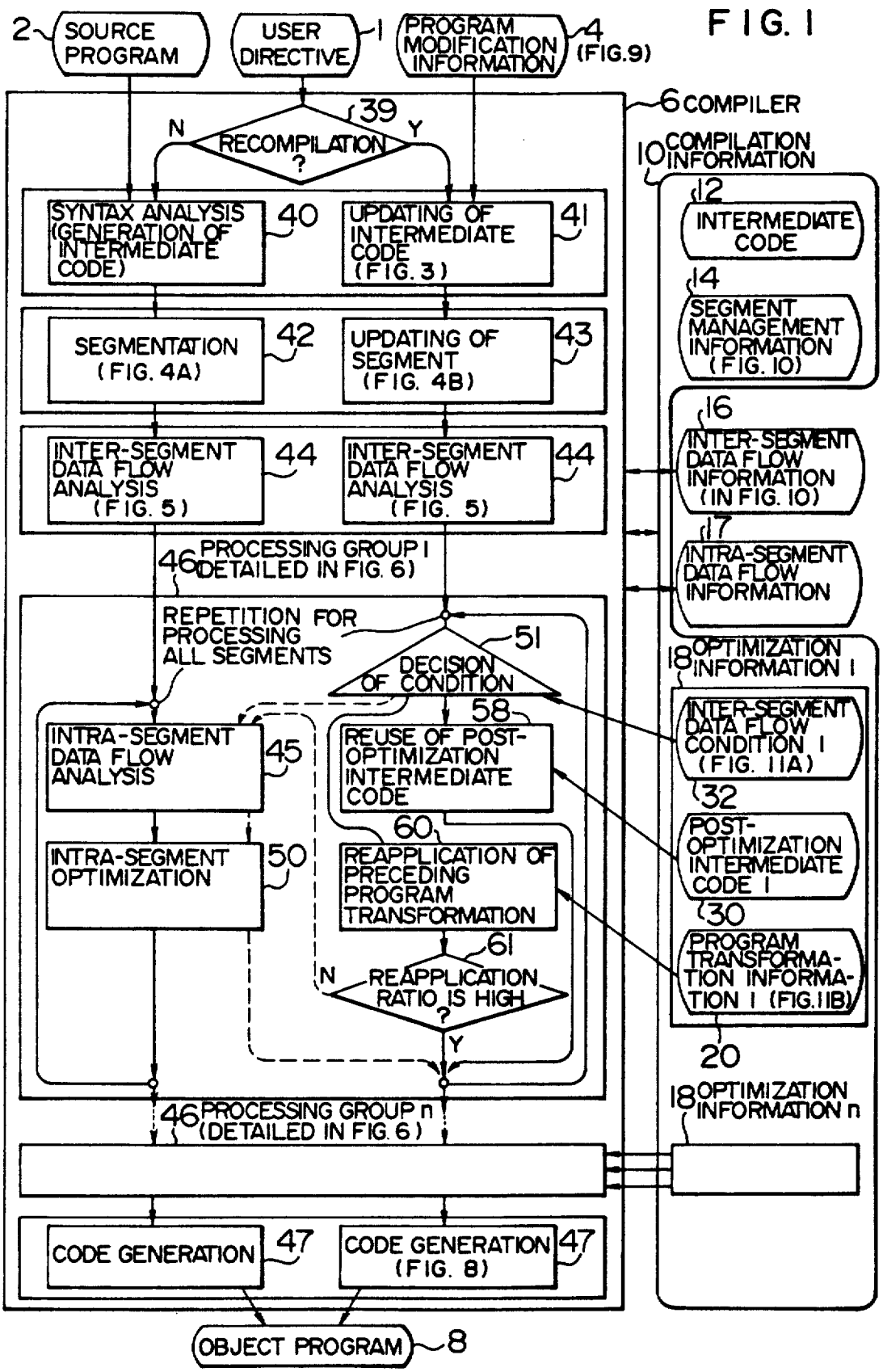

FIG. 2B

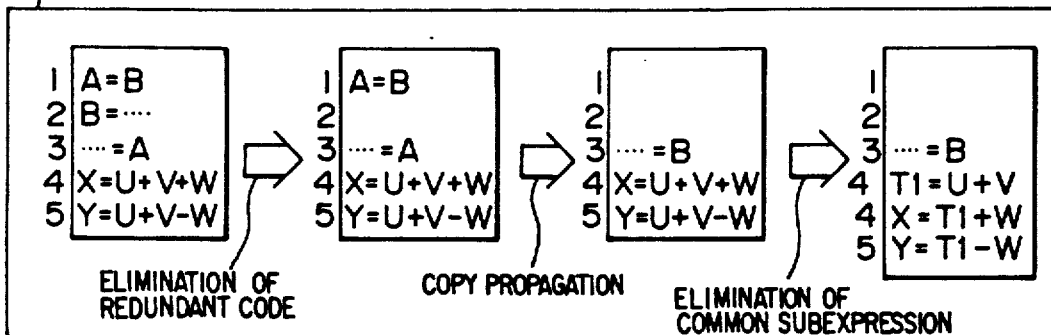

522 EXAMPLE OF OPTIMIZATION PROCESSING IN INITIAL COMPILATION

ELIMINATION OF REDUNDANT CODE → COPY PROPAGATION → ELIMINATION OF COMMON SUBEXPRESSION

524 EXAMPLE OF PROGRAM TRANSFORMATION INFORMATION

| TYPES OF OPTIMIZATION | OBJECTIVE FOR OPTIMIZATION | OPTIMIZATION APPLYING METHOD | PROGRAM TRANSFORMATION DOMAIN | CONDITIONS FOR PROGRAM TRANSFORMATION |
|---|---|---|---|---|
| ELIMINATION OF REDUNDANT CODE | WHOLE LINE 2 | DELETION OF LINE 2 | LINE 2 | VARIABLE B IS NOT Live IMMEDIATELY AFTER LINE 2 |
| COPY PROPAGATION | REFERENCE TO WHOLE LINE 1 AND VARIABLE A ON LINE 3 | DELETION OF LINE 1 AND REPLACEMENT OF REFERENCE TO VARIABLE A ON LINE 3 BY B | LINE 1 TO LINE 3 | NO REFERENCE HAS BEEN MADE TO VALUE OF A DEFINED AT LINE 1 AFTER LINE 3 |
| ELIMINATION OF COMMON SUB-EXPRESSION | SUBEXPRESSION U+V ON LINE 4; SUBEXPRESSION U+V ON LINE 5 | INSERTION OF CALCULATION CODE "T1=U+V" FOR SUB-EXPRESSION "U+V" IMMEDIATELY BEFORE LINE 4 AND REPLACEMENT OF SUBEXPRESSION "U+V" BY VARIABLE T1 AT LINE 4 AND LINE 5 | LINE 4 TO LINE 5 | NONE |

28 RECORDS (HISTORY) OF PROGRAM TRANSFORMATION   24   26

6a C(I)=B

526 PROGRAM MODIFICATION INFORMATION (INSERTION OF LINE "C(I)=B" IMMEDIATELY AFTER LINE 6)

528 EXAMPLE OF PROCESSING IN RECOMPILATION (REAPPLICATION OF PRECEDING PROGRAM TRANSFORMATION)

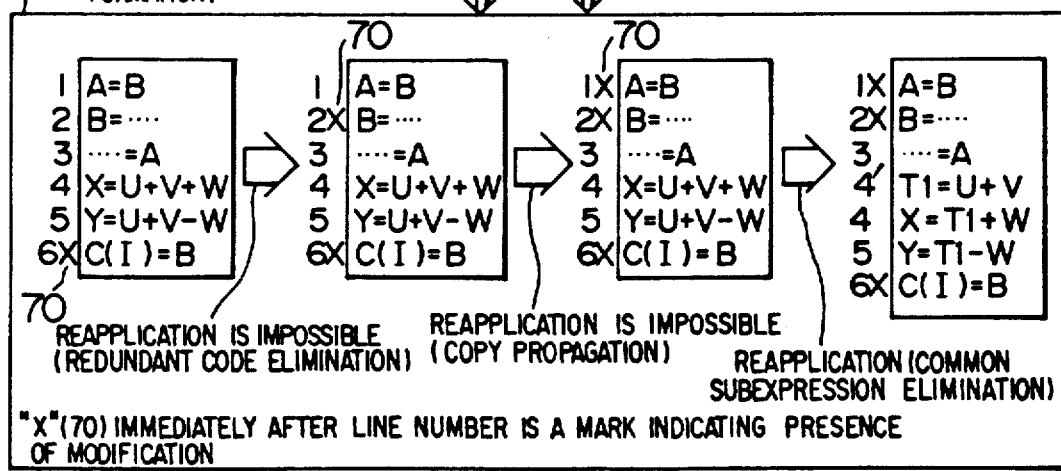

REAPPLICATION IS IMPOSSIBLE (REDUNDANT CODE ELIMINATION) → REAPPLICATION IS IMPOSSIBLE (COPY PROPAGATION) → REAPPLICATION (COMMON SUBEXPRESSION ELIMINATION)

"X"(70) IMMEDIATELY AFTER LINE NUMBER IS A MARK INDICATING PRESENCE OF MODIFICATION

FIG. 9

FORMAT OF PROGRAM MODIFICATION INFORMATION

| CONTENTS OF MODIFICATION | FORMS OF EXPRESSION | EXPLANATION |
|---|---|---|
| DELETION OF LINE | M,Nd | "M" AND "N" REPRESENT LINE NUMBERS IN OLD SOURCE PROGRAM AND INDICATE THAT M-TH TO N-TH LINES ARE TO BE DELETED |
| ADDITION OF LINE | Ma<br>LINE 1 TO BE INSERTED<br>⟨<br>LINE n TO BE INSERTED<br>. | "M" REPRESENTS LINE NUMBER IN OLD SOURCE PROGRAM AND INDICATE THAT NEW LINES 1 TO n ARE TO BE INSERTED IMMEDIATELY AFTER M-TH LINE. "." INDICATES THE END OF LINES TO INSERTED |
| REPLACEMENT OF LINE | M,NC<br>LINE 1 TO REPLACE<br>⟨<br>LINE n TO REPLACE<br>. | "M" AND "N" REPRESENT LINE NUMBERS IN OLD SOURCE PROGRAM AND INDICATE THAT M-TH TO N-TH LINES ARE REPLACED BY NEW LINES 1 TO n. "." INDICATE THE END OF LINES TO REPLACE |

FIG. 12A

| 99 LINE NUMBER | 2 SOURCE PROGRAM |
|---|---|
| 1 | `      SUBROUTINE SUB1(A,B,C,D,X,Y,P,T,U,L,M,N)` |
| 2 | `      REAL  A(L),B(L),C(L),D(L),X(M,L),Y(M,L)` |
| 3 | `      REAL  P(N,M,L),T(M),U(M)` |
| 4 | `      DO 10 K=1,L` |
| 5 | `      E=A(K)*C(K)` |
| 6 | `      F=B(K)*D(K)` |
| 7 | `  300 G=A(K)*C(K)+B(K)*D(K)+FN(E,F,M)` |
| 8 | `      DO 20 J=1,M` |
| 9 | `      T(J)=(X(J,K)*E+Y(J,K)*F)/G` |
| 10 | `   20 CONTINUE` |
| 11 | `      K1=K-1` |
| 12 | `      IF(K1.LT.1) K1=L` |
| 13 | `      G=1/G` |
| 14 | `      DO 30 J=1,M` |
| 15 | `      U(J)=(X(J,K1)*E+Y(J,K1)*F)*G` |
| 16 | `   30 CONTINUE` |
| 17 | `      DO 40 J=1,M` |
| 18 | `      DO 50 I=1,N` |
| 19 | `      P(I,J,K)=P(I,J,K)*T(J)+P(I,J,K1)*U(J)` |
| 20 | `   50 CONTINUE` |
| 21 | `   40 CONTINUE` |
| 22 | `   10 CONTINUE` |
| 23 | `      DO 60 K=1,L` |
| 24 | `      W1=A(K)` |
| 25 | `      W2=B(K)` |
| 26 | `      IF(W2.GT.W1) W1=W2` |
| 27 | `      A(K)=W1` |
| 28 | `   60 CONTINUE` |
| 29 | `      END` |

FIG. 12B

```
          99 LINE NUMBER           12 INTERMEDIATE CODE
         ┌──4──┬──────────────────────────────────────────────┐
         │  4  │     DO 10 K=1,L                              │
         │  5  │     E=A[K*4]*C[K*4]                          │
SEGMENT 1│  6  │     F=B[K*4]*D[K*4]                          │
         │  7  │ 300 G=A[K*4]*C[K*4]+B[K*4]*D[K*4]+FN(E,F,M)  │
         │  8  │     DO 20 J=1,M                              │
         │  9  │     T[J*4]=(X[J*4+K*M*4]*E+Y[J*4+K*M*4]*F)/G │
         │ 10  │  20 CONTINUE                                 │
         │ 11  │     KI=K-1                                   │
         ├─────┼──────────────────────────────────────────────┤
         │ 12  │     IF(KI.LT.1) KI=L                         │
SEGMENT 2│ 13  │     G=1/G                                    │
         │ 14  │     DO 30 J=1,M                              │
         │ 15  │     U[J*4]=(X[J*4+KI*M*4]*E+Y[J*4+KI*M*4]*F··│
         │ 16  │  30 CONTINUE                                 │
         ├─────┼──────────────────────────────────────────────┤
         │ 17  │     DO 40 J=1,M                              │
SEGMENT 3│ 18  │     DO 50 I=1,N                              │
         │ 19  │     P[I*4+J*N*4+K*N*M*4]=P[I*4+J*N*4+K*N*M*··│
         │ 20  │  50 CONTINUE                                 │
         │ 21  │  40 CONTINUE                                 │
         │ 22  │  10 CONTINUE                                 │
         ├─────┼──────────────────────────────────────────────┤
         │ 23  │     DO 60 K=1,L                              │
         │ 24  │     W1=A[K*4]                                │
SEGMENT 4│ 25  │     W2=B[K*4]                                │
         │ 26  │     IF(W2.GT.W1) W1=W2                       │
         │ 27  │     A[K*4]=W1                                │
         │ 28  │  60 CONTINUE                                 │
         └─────┴──────────────────────────────────────────────┘
```

(EXAMPLE OF PROGRAM TRANSFORMATION INFORMATION 20)

FIG. 16A

99 LINE NUMBER — 30 POST-OPTIMIZATION INTERMEDIATE CODE (IMMEDIATELY AFTER EXCUTION OF PROCESSING GROUP 1 IN INITIAL COMPILATION)

SEGMENT 1:
```
 4        DO 10 K=1,3
 5        E=A[K*4]*C[K*4]
 6        F=B[K*4]*D[K*4]
 7  300   G=A[K*4]*C[K*4]+B[K*4]*D[K*4]+F(E,F,M)
          K400=K*400
 8        DO 20 J4=4,400,4
 9        T[J4]=(X[J4+K400]*E+Y[J4+K400]*F)/G
10    20  CONTINUE
          J=101
11        K1=K-1
```

FIG. 16B

99 LINE NUMBER — 30 POST-OPTIMIZATION INTERMEDIATE CODE (IMMEDIATELY AFTER EXCUTION OF PROCESSING GROUP 2 IN INITIAL COMPILATION)

SEGMENT 1:
```
 4        DO 10 K=1,3
          K4=K*4
 5        E=A[K4]*C[K4]
 6        F=B[K4]*D[K4]
 7  300   G=E+F+FN(E,F,M)
          K400=K*400
 8        DO 20 J4=4,400,4
          JK4=J4+K400
 9        T[J4]=(X[JK4]*E+Y[JK4]*F)/G
10    20  CONTINUE
11        K1=K-1
```

FIG. 17

SUMMARIZATION OF INTER-SEGMENT DATA FLOW CONDITIONS

| SEGMENT No.<br>PROCESSING GROUPS | SEGMENT 1 | SEGMENT 2 | SEGMENT 3 | SEGMENT 4 |
|---|---|---|---|---|
| PROCESSING GROUP 1<br>(• MOVE OF LOOP INVARIANT<br>• REDUCTION OF INDUCTION EXPRESSION<br>• CONSTANT PROPAGATION) | • VARIABLE 'L' ASSUMES CONSTANT VALUE OF 3 AT SEGMENT ENTRANCE (LINE 4)<br>• VARIABLE 'M' ASSUMES CONSTANT VALUE OF 100 AT SEGMENT ENTRANCE (LINE 5)<br>• VALUE OF 'M' IS NOT ALTERED BY CALLING OF FUNCTION FN OF LINE 7 | • VARIABLE 'M' ASSUMES VALUE OF '100' AT SEGMENT ENTRANCE (LINE 12) (CONSTANT PROPAGATION) | • VARIABLE 'M' ASSUMES CONSTANT VALUE OF '100' AT SEGMENT ENTRANCE (LINE 17)<br>• VARIABLE N ASSUMES CONSTANT VALUE OF 150 (CONSTANT PROPAGATION) | • VARIABLE 'L' ASSUMES CONSTANT VALUE OF '3' AT SEGMENT ENTRANCE (LINE 23) (CONSTANT PROPAGATION) |
| PROCESSING GROUP 2<br>(• ELIMINATION OF COMMON SUBEXPRESSION<br>• COPY PROPAGATION<br>• ELIMINATION OF REDUNDANT CODE) | • VARIABLE 'J' IS NOT LIVE AT SEGMENT EXITE (LINE 11) (REDUNDANT CODE ELIMINATION) | • VARIABLE 'J' IS NOT LIVE AT SEGMENT EXIT (LINE 16) (REDUNDANT CODE ELIMINATION) | • VARIABLES 'J' AND 'I' ARE NOT LIVE AT SEGMENT EXIT (LINE 22) (REDUNDANT CODE ELIMINATION) | • VARIABLE 'K' IS NOT LIVE AT SEGMENT EXIT (LINE 28) (REDUNDANT CODE ELIMINATION) |
| PROCESSING GROUP 3<br>(ALLOCATION OF OPTICAL REGISTER) | NONE | • VARIABLE 'G' IS NOT LIVE AT SEGMENT EXIT (LINE 16) (OMISSION OF STORAGE OF 'G' VALUE IN MEMORY) | NONE | • VARIABLES 'W1' AND 'W2' ARE NOT LIVE AT SEGMENT EXIT (LINE 28) (OMISSION OF STORAGE OF 'W1' AND 'W2' VALUE IN MEMORY) |

FIG. 19

90 LINE NUMBER
70 MODIFICATION MARK
12 INTERMEDIATE CODE (IN RECOMPILATION)

```
SEGMENT 1:
 4       DO 10 K=1,L              (OPTIMIZATION STATUS
 5       E=A[K*4]*C[K*4]              NUMBER = 1)
 X       IF(K.EQ.L) GO TO 300
 6       F=B[K*4]*D[K*4]
 7X  300 G=A[K*4]*C[K*4]+B[K*4]*D[K*4]+FN(E,F,M)
 8       DO 20 J=1,M
 9       T[J*4]=(X[J*4+K*M*4]*E+Y[J*4+K*M*4]*F)/G
10    20 CONTINUE
11       KI=K-1

SEGMENT 2:
12       IF(KI.LT.1) KI=L
13       G=1/G                    (OPTIMIZATION STATUS NUMBER = 1)
14       DO 30 J=1,M
15       U[J*4]=(X[J*4+KI*M*4]*E+Y[J*4+KI*M*4]*F···
16    30 CONTINUE

SEGMENT 3:
17       DO 40 J=1,M
18       DO 50 I=1,N
19       P[I*4+J*N*4+K*N*M*4]=P[I*4+J*N*4+K*N*M*···
20    50 CONTINUE
21    40 CONTINUE                 (OPTIMIZATION STATUS NUMBER = 1)
22    10 CONTINUE

SEGMENT 4:
 X       W1=B[1]
23       DO 60 K=1,L
24X                               (OPTIMIZATION STATUS NUMBER=0)
25       W2=B[K*4]
26       IF(W2.GT.W1) W1=W2
27X
 X       B[K*4]=G
28    60 CONTINUE
```

FIG. 20

| SEGMENT No.<br>PROCESSING GROUPS | SEGMENT 1 | SEGMENT 2 | SEGMENT 3 | SEGMENT 4 |
|---|---|---|---|---|
| PROCESSING GROUP 1 | · REAPPLICATION OF PRECEDING PROGRAM TRANSFORMATION<br><br>(ON THE BASIS OF INFORMATION OF PROGRAM TRANSFORMATION IN INITIAL COMPILATION, REAPPLICATION OF SAME TRANSFORMATION PROGRAM AS IN THE PRECEDING TRANSFORMATION IS TRIED) | · REUSE OF POST-OPTIMIZATION INTERMEDIATE CODE<br><br>(POST-OPTIMIZATION INTERMEDIATE CODE IN PRECEDING COMPILATION IS USED INTACT) | · REAPPLICATION OF PRECEDING PROGRAM TRANSFORMATION<br><br>(BECAUSE INTER-SEGMENT DATA FLOW CONDITION BECOMES FALSE, i.e. BECAUSE N IS NO MORE CONSTANT VALUE OF "150") | · PROCESSING IN INITIAL COMPILATION<br><br>(SINCE OPTIMIZATION STATUS NUMBER IS SET TO 0 UPON UPDATING BECAUSE OF HIGH MODIFICATION RATIO, DATA FLOW ANALYSIS AND OPTIMIZATION IS PERFORMED IN SEGMENT) |
| PROCESSING GROUP 2 | · REAPPLICATION OF PRECEDING PROGRAM TRANSFORMATION<br>· PROCESSING IN INITIAL COMPILATION<br><br>(BECAUSE REAPPLICATION RATIO IN PRECEDING PROGRAM TRANSFORMATION REAPPLICATION IS NOT SUFFICIENTLY HIGH) | DITTO | · REAPPLICATION OF PRECEDING PROGRAM TRANSFORMATION<br><br>(BECAUSE A PART OF PROGRAM TRANSFORMATION TRIED FOR REAPPLICATION IN PROCESSING GROUP "1" HAS FAILED AND THUS INTEREDIATE CODE WITH MODIFICATION MARK IS INCLUDED IN SEGMENT) | DITTO |
| PROCESSING GROUP 3 | · PROCESSING IN INITIAL COMPILATION<br><br>(BECAUSE OPTIMIZATION STATUS NUMBER IS SET TO -1) | REAPPLICATION OF PRECEDING PROGRAM TRANSFORMATION | · REAPPLICATION OF PRECEDING PROGRAM TRANSFORMATION | DITTO |

FIG. 21A

| 802 Permissibility of Reapplication | Type of Optimization | Objective for Optimization | Method of Applying Optimization | 24 Program Transformation Domain | 26 Conditions for Program Transformation |
|---|---|---|---|---|---|
| ○ | MOVE OF LOOP INVARIANT EXPRESSION | DO LOOP CONTROL STATEMENT ON LINE "9" AND EXPRESSIONS "J≠4" ON LINE "9" (ALL THREE) | MOVE OF CALCULATION OF "K=M*4" TO ENTRANCE OF LOOP DO20, I.e. REPLACEMENT OF "K=M*4" BY TEMPORARY VARIABLE "K400" AND INSERTION OF ASSIGNMENT STATEMENT "K400=M*4" IMMEDIATELY BEFORE LINE "8" | FROM LINE "8" TO LINE "10" (THE WHOLE OF LOOP DO 20) | NONE |
| ○ | REDUCTION OF INDUCTION EXPRESSION | BOTH OF FIRST AND SECOND EXPRESSIONS "K=M*4" ON LINE "9" | REPLACEMENT OF ALL EXPRESSIONS "J≠4" ON LINE "9" BY TEMPORARY VARIABLE "J≠4" AND REPLACEMENT CONTROL STATEMENT OF DO LOOP BE DO20,J4=4,M*4,4. INSERTION OF STATEMENT J=101 IMMEDIATELY AFTER LINE "10" FOR ENSURING VALUE FOR VARIABLE "J" | FROM LINE "8" TO LINE "10" (THE WHOLE OF LOOP DO 20) | NONE |
| × | CONSTANT PROPAGATION | ASSIGNMENT STATEMENT INSERTED IMMEDIATELY BEFORE LINE "8" THROUGH LOOP INVARIANT MOVE AND VARIABLE "M" ON LINES 7 AND "8" | AFTER VARIABLE "M" IS REPLACED BY CONSTANT VALUE OF "100", CONSTANT SUBEXPRESSION IS EVALUTED AND REPLACED BY CONSTANT VALUE | FROM LINE "5" TO LINE "8" | VARIABLE M ASSUMES A CONSTANT VALUE OF "100" AT SEGMENT ENTRANCE (LINE 5). VALUE OF VARIABLE M IS NOT ALTERED BY CALLING OF FUNCTION FN |
| ○ | CONSTANT PROPAGATION | VARIABLE L ON LINE "4" | REPLACEMENT OF VARIABLE L BY CONSTANT VALUE OF "3" | LINE "4" | VALUE OF "L" IS "3" AT ENTRANCE OF SEGMENT (LINE 4) |

28 RECORD (HISTORY) OF PROGRAM TRANSFORMATION

28 OUTLINE OF PROGRAM TRANSFORMATION INFORMATION (FOR SEGMENT 1 IN PROCESSING GROUP 1)

RESULT OF DECISION AS TO REAPPLICABILITY OF PRECEDING PROGRAM TRANSFORMATION IN RECOMPILATION

FIG. 21B

| 802 PERMISSIBILITY OF REAPPLICATION | 28 RECORD (HISTORY) OF PROGRAM TRANSFORMATION ||||| 26 |
|---|---|---|---|---|---|
| | TYPE OF OPTIMIZATION | OBJECTIVE FOR OPTIMIZATION | METHOD OF APPLYING OPTIMIZATION | 24 PROGRAM TRANSFORMATION DOMAIN | CONDITIONS FOR PROGRAM TRANSFORMATION |
| ✕ | ELIMINATION OF COMMON SUBEXPRESSION | A[K*4]=C[K*4] ON LINE 5 AND A[K*4]=C[K*4] ON LINE 7 | REPLACEMENT OF A[K*4]=C[K*4] ON LINE 7 BY VARIABLE E | FROM LINE 5 TO LINE 7 | NONE |
| ✕ | ELIMINATION OF COMMON SUBEXPRESSION | B[K*4]=D[K*4] ON LINE 6 AND B[K*4]=D[K*4] ON LINE 7 | REPLACEMENT OF B[K*4]=D[K*4] ON LINE 7 BY VARIABLE F | FROM LINE 6 TO LINE 7 | |
| ✕ | ELIMINATION OF COMMON SUBEXPRESSION | ALL K*4 ON LINES 5 AND 6 (K*4 ON LINE 7 HAS ALREADY BEEN ELIMINATED) | REPLACEMENT OF ALL APPEARANCES OF "K*4" BY TEMPORARY VARIABLE K4. INSERTION OF ASSIGNMENT STATEMENT OF K4=K*4 IMMEDIATELY BEFORE LINE 5 | FROM LINE 5 TO LINE 6 | |
| ○ | ELIMINATION OF COMMON SUBEXPRESSION | BOTH EXPRESSIONS OF "J4+K400" ON LINE 9 | REPLACEMENT OF TWO APPEARANCES OF "J4+K400" BY TEMPORARY VARIABLE "JK4". INSERTION OF ASSIGNMENT STATEMENT OF "JK4=J4+K400" IMMEDIATELY BEFORE LINE 9. | LINE 9 | |
| ○ | ELIMINATION OF REDUNDANT CODE | ASSIGNMENT STATEMENT OF "J=101" IMMEDIATELY AFTER LINE 10 | DELETION OF ASSIGNMENT STATEMENT "J=101", i.e. REPLACEMENT BY DUMMY STATEMENT | FROM STATEMENT OF "J=101" TO LINE 11 | VALUE OF VARIABLE J IS NOT LIVE AT SEGMENT EXIT (LINE 11) |

RESULT OF DECISION AS TO REAPPLICABILITY OF PRECEDING PROGRAM TRANSFORMATION IN RECOMPILATION

20 OUTLINE OF PROGRAM TRANSFORMATION INFORMATION (FOR PROCESSING GROUP 2 OF SEGMENT 1)

FIG. 22  28 — RECORD (HISTORY) OF PROGRAM TRANSFORMATION

| 802 — PERMISSIBILITY OF REAPPLICATION | TYPE OF OPTIMIZATION | OBJECTIVE FOR OPTIMIZATION | METHOD OF APPLYING OPTIMIZATION | 24 — PROGRAM TRANSFORMATION DOMAIN | 26 — CONDITIONS FOR PROGRAM TRANSFORMATION |
|---|---|---|---|---|---|
| ◯ | CONSTANT PROPAGATION | VARIABLES M ON LINES 7,8 AND LINE INSERTED IMMEDIATELY BEFORE LINE 8 AS A RESULT OF LOOP INVARIANT MOVE | (OMITTED) | ABSENT | M IS SAME CONSTANT VALUE OF 5 AT ALL ENTRANCES OF SEGMENT 1 FOR WHICH CONTROL CAN REACH LINE 8 AND VALUE OF M IS NOT ALTERED BETWEEN SEGMENT ENTRANCE AND LINE 8 |
| ◯ | ELIMINATION OF COMMON SUBEXPRESSION | A[K*4]=C[K*4] ON LINE 5 AND A[K*4]=C[K*4] ON LINE 7 | (OMITTED) | ABSENT | NO STATEMENT FOR ALTERING VALUES OF VARIABLES E,A,C IS PRESENT BETWEEN LINE 5 AND LINE 7 WITH LINE 5 DOMINATING LINE 7 |
| × | ELIMINATION OF COMMON SUBEXPRESSION | B[K*4]=D[K*4] ON LINE 6 AND B[K*4]=D[K*4] ON LINE 7 | (OMITTED) | ABSENT | NO STATEMENT FOR ALTERING VALUES OF VARIABLES F,B,D IS PRESENT BETWEEN LINE 6 AND LINE 7 WITH LINE 6 DOMINATING LINE 7 |
| ◯ | ELIMINATION OF COMMON SUBEXPRESSION | ALL K*4 ON LINE 5 AND LINE 6 | (OMITTED) | ABSENT | NO STATEMENT FOR ALTERING VALUES OF VARIABLES K IS PRESENT BETWEEN LINE 5 AND LINE 6 WITH LINE 5 DOMINATING LINE 7 |

20 — A VARIATION FROM COMBINATION OF PROGRAM TRANSFORMATION DOMAIN AND PROGRAM TRANSFORMATION CONDITION FOR WHICH REAPPLICABILITY IS X IN FIG. 21A AND 21B

PERMISSIBILITY OF REAPPLICATION WHEN PROGRAM TRANSFORMATION DOMAIN AND PROGRAM TRANSFORMATION CONDITION ARE CHANGED

METHOD OF RECOMPILING A PROGRAM BY USING RESULT OF PREVIOUS COMPILATION

BACKGROUND OF THE INVENTION

The present invention relates to a recompiling or recompilation method for generating object codes upon modification of a source program by making use of the result of previous compilation of the source program.

With "optimization in a compiler", a variety of program transformations are performed on a source program for the purpose of generating object programs capable of being executed at a higher speed. The run or execution performance of the object program generated by the compiler on a computer depends in large part on the performance or technique of the optimization processing. Accordingly, various devices or tools have been proposed in recent years in an effort to enhance or increase the ability of the compiler in performing the optimization processing. However, at the same time, it is to be noted that the optimization processing is very complicated and that the time taken for the optimization processing, and hence the time involved in the compilation, has increased significantly. Under the circumstances, as a measure for reducing the time taken for compilation (recompilation) of a source program undergone modification, a procedure of automated recompilation is known according to which, upon first or initial compilation of a source program, the procedures in the source program, which are the minimum units for the compilation and which are also referred to as subroutines, functions or the like, are separately compiled to obtain object program portions corresponding to the associated procedures, respectively, which object program portions are then combined together for execution. The object program portions obtained for the individual procedures, respectively, are saved separately, so that, when any one of the procedures in the original source program has been modified, recompilation is effected in such a manner that only the procedures which have undergone modification are recompiled, while for the procedures which have undergone no modification, the corresponding object program portions obtained previously are reused. According to a known technique for automating the execution of the procedures necessitating the recompilation (automated recompilation technique), the date of modification of each procedure is compared with the date of generation of the object program, and a decision is made that the recompilation is necessary when the former is a newer procedure than the latter. In this conjunction, reference may be made, for example, to "Software-Practice and Experience", Vol. 9, pp. 255-265 (1979).

The above mentioned technique can be applied only to such a case in which the compiler does not execute inter-procedural optimization, which is the optimization to be performed across a plurality of procedures in the source program. When the inter-procedural optimization is to be effectuated by the compiler, modification of a given one of the procedures exerts influence on a plurality of the other procedures taking part in the optimization. Consequently, it becomes necessary to recompile not only the modified procedures, but also several unmodified procedures. Those of the unmodified procedures which the recompilation are determined in dependence on the contents of the inter-procedural optimization performed by the compiler. Accordingly, by recording the information concerning the inter-procedural optimization carried out by the compiler, it is possible to extract automatically only the procedures that are to be recompiled even when the inter-procedural optimization has been performed, thereby allowing only the extracted procedures to be recompiled, as is disclosed in "ACM, Proceedings of the SIGPLAN 86 Symposium on Compiler Construction": SIGPLAN Notices, Vol. 21, No. 7 (July 1986), pp. 58-67.

According to the methods mentioned above, when an optimization processing is performed on individual procedures, inter-procedural data flow conditions, which are conditions on data flow of information across a procedure required for application of the optimization to the procedure, is recorded for the procedure. Data flow information represents where the value of a valuable is modified or used. Upon recompilation, new inter-procedural data flow information is extracted for the procedures in the modified program, whereon a decision on each procedure is made as to whether or not the new inter-procedural data flow information satisfies the inter-procedural data flow condition previously stored for the procedure. If the condition is satisfied, it can then be determined that the inter-procedural optimization processing carried out for the procedure in the original compilation is capable of being applied to that procedure even after the program modification. Accordingly, instead of recompiling the procedure which satisfies the inter-procedural data flow condition even after modification of the program as mentioned above, the object program portion generated for that procedure in the original compilation can be reused, while the other procedures which can not satisfy the abovementioned condition are recompiled on the basis of the new inter-procedural data flow information.

As another technique for reducing the processings involved in a recompilation, there can be mentioned an incremental compilation according to which intermediate codes obtained through syntax analysis processing performed on a source program to be compiled are held or saved, wherein when the source program is to be recompiled after modification thereof, only the program statements which have undergone modification are again analyzed with respect to syntax, while for the other program statements, the intermediate codes obtained in the original compilation are reused. In this manner, the amounts of the objectives for the syntax analysis processing can be reduced. Since the syntax analysis is inherently a local processing, it is relatively easy to reprocess only the modified portions mentioned above. This technique is reported in "ACM, Proceedings of the SIGPLAN 84 Symposium on Compiler Construction": SIGPLAN Notices, Vol. 19, No. 5 (June 1984), pp. 122-131.

SUMMARY OF THE INVENTION

According to the abovementioned automated recompilations known heretofore, it is possible to automatically identify discriminatively the procedure which necessitates recompilation. However, for the modified procedure as well as the unmodified procedure for which the necessity for recompilation is found, the whole optimization processing must be redone for all of the procedures. Consequently, no appreciable processing reduction can be attained for these procedures.

According to the conventional incremental compilation technique, the syntax analysis as performed is limited to only the portions that have undergone modification. However, the purpose of the incremental compilation is to compile the program after modification as rapidly as possible for thereby allowing a debug to be carried out efficiently by running and testing the compiled program. For this reason, no optimization processing is performed in the case of the incremental compilation. Under the circumstance, no consideration is given at all to the optimization processing which requires global processing. Consequently, no appreciable reduction in the time taken for the compilation processing can be achieved in the optimizing compiler in which a major proportion of the time for compilation processing is taken for the optimization processing.

An object of the present invention is therefore to provide a compiling method which is capable of reducing the time taken for the recompilation of a program which needs to be recompiled, such as a modified procedure which requires recompilation because of the modification or an unmodified procedure requiring recompilation because of modification of other associated procedures.

It is another object of the present invention to provide a compiling method which is capable of reducing the portions to be recompiled in a procedure which requires recompilation.

A further object of the present invention is to provide a compilation method which is capable of reducing the amount of optimization processing to be performed on a program demanding recompilation.

In view of the above objects, in the compiler according to the present invention, a procedure being compiled is split or segmented into a plurality of units referred to as segments, whereon the optimization is carried out for each of the segments (i.e. on a segment-by-segment basis). Upon recompilation of the procedure, optimization of the procedure is not redone for the whole of the procedure but is performed only on the segments which are affected by the modification, while for the segments which are not influenced by the modification, the object program obtained in the abovementioned compilation, or the intermediate results (intermediate codes) available in the course of the optimization, are reused.

According to a preferred mode for carrying out the invention, it is proposed that, at several stages of optimization, interim or intermediate results of the optimization are recorded, wherein upon recompilation, the intermediate results of the optimization obtained in the preceding compilation are made use of up to the stage where no influence by the modification makes an appearance. Thus, the amount of processings involved in the optimization can be reduced even when the object program can not be utilized.

In another preferred mode for carrying out the invention, not only the interim results of optimization, but also the contents of optimization as executed (e.g. the condition for application of certain partial optimization processing, objectives for application, method for application, etc.) are recorded. Upon recompilation, those of the optimization processings executed in the preceding compilation which are to be executed again can be performed rapidly by making use of the contents as stored. Thus, the time taken for the execution of the optimization processing to be re-executed can be reduced significantly.

BRIEF DESCRIPTION OF THE DRAWINGS

FIG. 1 is a diagram showing generally a structural arrangement of a compiler system for carrying out a compiling method according to an embodiment of the invention;

FIG. 2B is a diagram for illustrating reapplication of a preceding program transformation;

FIG. 9 is a view showing a format or structure of program modification information;

FIG. 12A is a view showing an example of source program to which the invention is to be applied;

FIG. 12B shows an example of segmentation of intermediate code in the program shown in FIG. 12A;

FIG. 16A is a view illustrating post-optimization intermediate codes obtained after processing in a processing group (1) in an example of application of the invention;

FIG. 16B shows post-optimization intermediate codes obtained after processing in a processing group (2) in an example of application of the invention;

FIG. 17 is a view showing in summarization the inter-segment data flow conditions in an example of application of the invention;

FIG. 19 is a view for illustrating an example of segmentation upon recompilation in an example of application of the invention;

FIG. 20 is a view for illustrating in summarization the processings involved in the recompilation in an example of application of the invention;

FIG. 21A shows in summarization a structure of program transformation information and reapplication thereof (processing of segment 1 in the processing group 1);

FIG. 21B shows in summarization a structure of program transformation information and reapplication thereof (processing of segment 1 in a processing group 2);

FIG. 22 is a view for illustrating how the program transformation information can be reused when the program transformation domain and the program transformation condition are changed in an example of application of the invention;

DESCRIPTION OF THE PREFERRED EMBODIMENTS

Figure 2A:
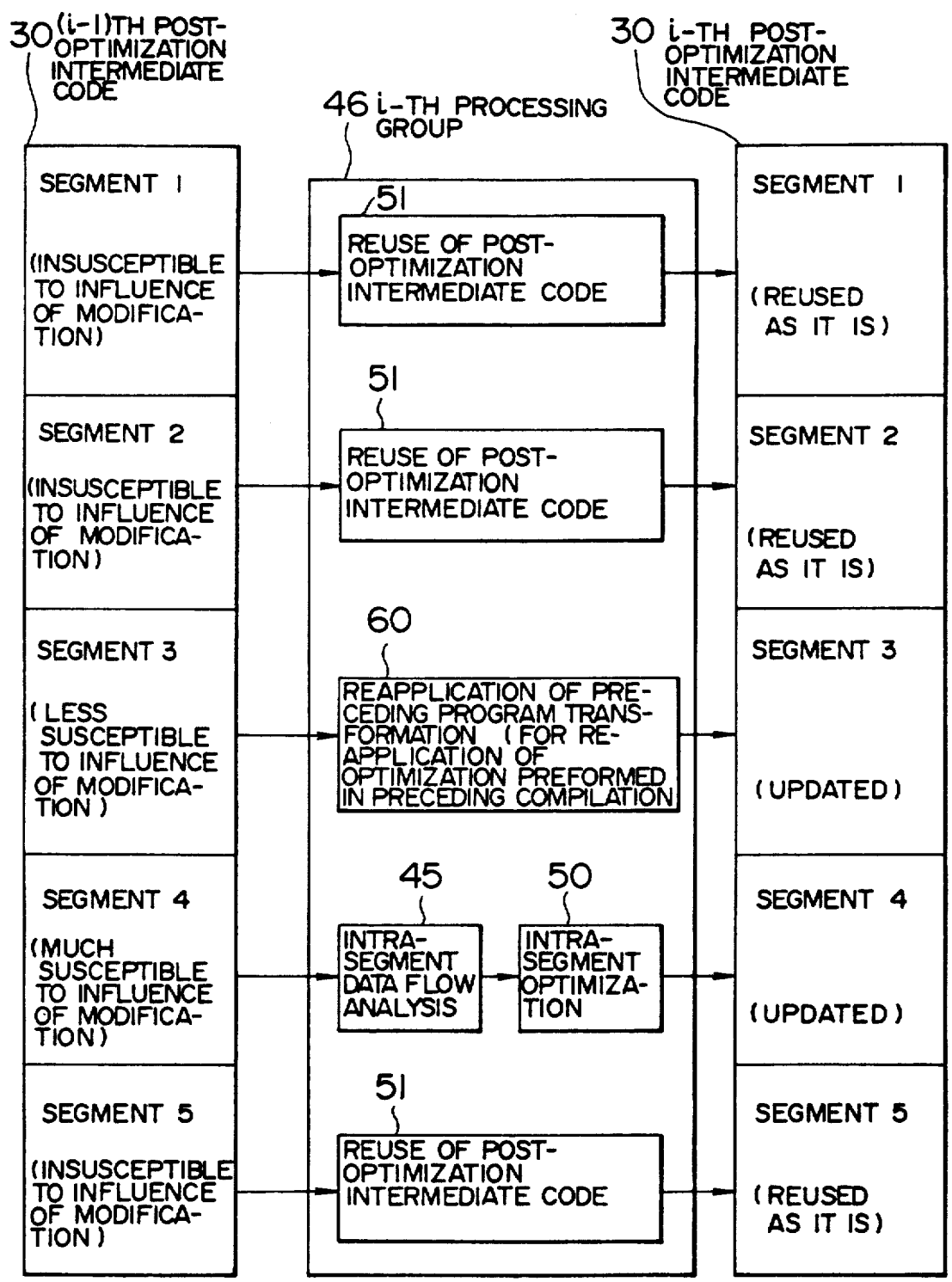
FIG. 2A is a diagram illustrating the processings performed upon recompiling.

In the following, the present invention will be described in detail in conjunction with preferred or exemplary embodiments thereof.

FIG. 1 is a diagram showing generally a structural arrangement of a compiler system for carrying out the compiling method according to a first embodiment of the present invention. Referring to FIG. 1, a reference numeral 1 denotes a user directive which indicates or directs whether the compilation to be performed is a recompilation or an initial (first) compilation, a numeral 2 denotes a source program for the procedures to be compiled, numeral 4 designates program modification information which describes the contents of the modification made on the source program 2 after the immediately preceding compilation, a numeral 6 denotes a compiler, 8 designates an object program, and 10 designates compilation-information which represents the records of the compilation processing as carried out and which is recorded, updated and made use of for reducing the processings involved in a recompilation to be performed.

The compiler 6 is supplied as inputs thereto with the user directive 1, the source program 2 and the program modification information 4 and outputs the object program 8. However, in the case of the initial compilation, only the user directive and the source program 2 is supplied to the compiler 6, while upon recompilation, only the user directive and the program modification information 4 is furnished to the compiler 6. Parenthetically, the user directive 1, the source program 2 and the program modification information 4 are not necessarily inputted manually. Rather, they should preferably be supplied automatically by a system for managing or supervising the recompilation of the procedure (such as, for example, a "make" command in UNIX).

In the compilation processing, the compiler 6 also performs recording, updating and using of the compilation information 10. The compilation information 10 is data held permanently regardless of the activation and deactivation of the compiler 6 so as to be updated and/or utilized upon recompilation. Further, the compiler 6 performs recording and utilization of inter-segment data flow information 16 and intra-segment data flow information 17 which are temporary data held only during the compile processing.

Before entering into the detailed description of the arrangement according to the embodiment of the invention by reference to FIG. 1, a method of reducing the processings involved in the optimization as adopted in the instant embodiment and the effects achieved by the method will be briefly elucidated by referring to FIGS. 2A and 2B.

FIG. 2A is a diagram illustrating the processings performed in the recompilation according to the teaching adopted in the instant embodiment if the invention. It is first to be noted that according to the instant embodiment, the optimization processing involved in the compilation is classified into several processing groups 46, wherein an intermediate code (post-optimization intermediate code) 30 is recorded for each of the processing groups 46 upon completion of the processing therefor in the initial compilation. Upon recompilation, the post-optimization intermediate codes 30 can be reused for the relevant processing groups in place of performing the optimization processing so long as the processing groups are undergoing a processing which is insusceptible to the influence of modification. At a center portion of the figure, there is shown in i-th processing group 46 with the corresponding post-optimization intermediate code 30 being shown at the right-hand side while the post-optimization intermediate code 30 of the (i-1)-th processing group 46 is shown at the left-hand side. The processing group 46 is inputted with the post-optimization intermediate code 30 of the (i-1)-th processing group which has been updated by recompilation, for updating the post-optimization intermediate code 30 of the i-th processing group 46. The post-optimization intermediate code 30 is split into several segments even if it is the intermediate code corresponding to a single procedure, wherein the processings are performed separately on the segments individually in consideration of the influence of the modification of the program.

The purpose of dividing or splitting both the optimization processing and the intermediate codes into several parts, respectively, is to enhance the reusability of the post-optimization intermediate code 30 to thereby make it possible to reduce or curtail significantly the processings involved in the compilation. It should be noted that this sort of splitting or division has not heretofore been practiced. Consequently, it was necessary in the past to execute all the optimization processings for all of the procedures when one of them had been subject to modification. By dividing the optimization processing into partial optimization processing groups and by splitting the intermediate code into segments, as mentioned above according to the teaching of the invention, it is now possible to reuse the post-optimization intermediate code 30 for each segment on a segment-by-segment basis so long as the optimization processing of the associated processing group 46 is insusceptible to the influence of modification. In the case of the example illustrated in FIG. 2A, the segments "1", "2" and "5" are insusceptible to the influence of modification. Accordingly, the i-th post-optimization intermediate code 30 already recorded can be reused as it is (reuse of post-optimization intermediate code 51) by the i-th processing group, which results in the practical advantage that there is no necessity to do anything in reality. As a result of this, the amount of processing for the compilation can be significantly reduced. On the other hand, it is noted that, for the segment "3", the post-optimization intermediate code 30 can no longer be reused intact (i.e. as it is), because it has undergone the influence of modification. However, since the influence of modification is of less significance in this case, it is also possible to reduce the amount of processings required for the optimization by resorting to another method which may be referred to as reapplication of preceding program transformation (or preceding program transformation reapplication method) 60, according to which the contents (such as the type, objective, applying method, the conditions for application and the like) of the optimization processing carried out in the initial compilation are recorded so as to allow the optimization processing to be applied only to the reapplicable optimization which is determined on the basis of the above mentioned records. Thus, the optimization can be applied only on the basis of the decision as to the reapplicability without need for processings such as the detection of the objective for optimization and the method of optimization. Thus, the compilation processings can be significantly reduced or curtailed when compared with the case where all the optimization processings are completely to be redone.

FIG. 2B is a flow chart for illustrating the reapplication of the preceding program transformation 60.

Referring to FIG. 2B, an example of the optimization processing in the initial compilation is shown at 522, an example of the program transformation information 20 describing the contents of the above-mentioned optimization processing is shown at 524, an example of the program modification information 4 is shown at 526, and an example of the processing for recompilation (the preceding program transformation reapplication 60) is shown at 528. In the optimization processing 522 upon the initial compilation, there are executed sequentially deletion of the redundant code of the statement on the second line, copy propagation of an assignment statement from the first line to the third line, and a common subexpression elimination of the expression "U+V" appearing on the fourth and fifth lines.

In the figure, illustration is made only of the interim or intermediate results. In actuality, however, there are required for implementation of the optimization the detection of statements to be subjected to the deletion of redundant codes, detection of the statement which is a source of the copy in which the copy propagation originates and the expression of destination for the copy propagation and detection of subexpressions which constitute the common subexpression. For detection of the objectives for the optimization, an overall search is performed throughout the whole program. Accordingly, the amount of processings required to this end is enormous. Further, for other optimization processings such as, for example, reduction of induction expression, loop invariant move, loop expansion, inline expansion and others, there are available a variety of methods for the optimization. Accordingly, the optimization applying method has also to be determined. In general, the optimization processing can be separated into three stages, i.e. a stage for detecting the objectives for optimization, a stage for determining the method of applying the optimization and the stage for rewriting the intermediate codes. Although the amounts of the processings at the three stages mentioned above differ from one another in dependence on the types of the optimization, it can be said at the least that the amount of processings involved in first and second stages i.e., detecting the objectives for optimization and the determination of the optimization applying method exceed in most case one half of all the optimization processings. Besides, when the optimization is to be intensified or enhanced, the processings involved in the detection of the objectives for optimization as well as determination of the optimization applying method are increased in most cases because of a need for higher generalization of the objectives for optimization and increasing in the available types of optimization applying methods. In this regard, it should be mentioned that the reapplication of the preceding program transformation 60 is to reduce the two processing stages mentioned above, i.e. the processings involved in the detection of an objective for optimization and the determination of the optimization applying method. Reduction of these processings will result in a significant reduction of the processings for the compilation.

With the reapplication of the preceding program transformation 60 which is the processing performed in the recompilation, it is intended to reapply the optimization to the programs which have undergone modification. To this end, the program transformation information 20 is recorded at the time of the initial compilation. Upon recompiling, only the optimization which can be reapplied on the basis of the abovementioned program transformation information 20 is reapplied to the intermediate codes which includes the modification. As the contents of the program transformation information 20, there are recorded, as indicated at 524, the types or species of optimization, the objectives for optimization and the optimization applying method (collectively referred to as the program transformation record or history 28), a program transformation domain 24 (a domain of a program on which modification of the program affects the optimization thereof), and program transformation condition 26 (data flow condition which has made the optimization applicable). For example, in the case of deletion of the redundant code on the second row in FIG. 2B, the type of optimization is given as the deletion of the redundant code, the objective for the optimization is the whole of the second line and the method of optimization is to delete the whole of the second line, wherein the program transformation domain 24 is the second line and the program transformation condition 26 is that "a variable B immediately succeeding the second line is not live". In the case of the elimination of a common subexpression of "U+V" mentioned on the fourth and fifth rows in FIG. 2B, the objectives for the optimization are the subexpression "U+V" on the fourth line and the subexpression "U+V" on the fifth line within the block 522. The optimization applying method is that "a calculation code (T1=U+V) is inserted immediately before the fourth line and the subexpressions of "(U+V)" appearing on the fourth and fifth lines are replaced by the variable T1". The program transformation domain 24 covers the second and third lines. The program transformation condition is not present. An example of the processing for reapplication of the preceding program transformation 60 is illustrated within a block 528 on the assumption that the program modification information 4 indicated at 526 is furnished upon recompiling. The program modification information at 526 indicates that a new line "C(I)=B" is inserted immediately after the sixth line. In the case of the example 528, the line inserted has attached thereto a mark (X) as designated by a reference numeral 70 which mark indicates that the inserted line includes a modification. The preceding program transformation reapplication 60 is performed in a manner described below. For the redundant code deletion for the statement on the second line, no reapplication is executed because the program transformation condition is not satisfied (this will hereinafter be referred to as a condition which is false), since reference could be made to a variable B on the sixth line. Thus, the second line is not deleted, which results in an intermediate code differing from that in the initial compilation. In order to indicate this fact, the second line which contains the objective for the optimization has the modification mark 70 appended thereto. Upon copy propagation of the assignment statement from the first line to the third line the reapplication is not performed in view of the fact that there exists in the program transformation domain the line to which the modification mark (X) 70 is appended in the immediately preceding processing. In the case of the deletion of a common subexpression "U+V" on the fourth and fifth lines, the reapplication is performed because the program transformation domain 24 contains no modification and the program transformation condition 26 is satisfied (this will hereinafter be also mentioned that the condition is true), since an empty condition can be considered true.

As will be understood from the above, in the reapplication of preceding program transformation 60, the optimization carried out in the preceding compilation are sequentially examined as to the reapplicability thereof, whereon the reapplicable optimization is executed in the same manner as in the case of the preceding compilation. Consequently, the processings for the detection of the objective for the optimization and the determination of the method for optimization can be rendered unnecessary. Further, the decision concerning the reapplicability can be realized with a relatively low cost or burden when compared with the detection of the objectives for optimization or, to state it in another way, retrieval of the objectives for optimization throughout the whole program. This means that the processings for the compilation can be reduced significantly when compared with the case where all the processings for optimization have to be re-executed. In the case of the instant example which is adopted for elucidating the mechanism of decision as to the reapplicability, the ratio of the reapplication of optimization is not significantly high. It should however be understood that this ratio is ordinarily much higher of course, there may arise such situation that the ratio of the reapplicability becomes low, being accompanied with corresponding degradation in the run performance of the outputted object program, in dependence on the contents of the modification. In such case, it is preferred that the optimization be performed once more. To this end, there is provided a decision step 61 as shown in FIG. 1 where a decision is made as to the ratio of the reapplicability. The outline of the compile method according to the invention adopted in the instant embodiment will now be understood from the above.

In general, the main and important characteristic feature of the instant embodiment is seen in the division of the optimization processing into processing groups, splitting of a program into segments (i.e. segmentation), the reusing of the intermediate code 30 after optimization and the reapplication of the optimization by recording and utilizing the program transformation information 20.

Now, the arrangement shown in FIG. 1 will be described in detail. In the first place, it is decided whether the individual processings in the compiler 6 are those involved in the initial compilation or alternatively in the recompilation. More specifically, at a processing step 39 in the compiler 6, it is decided whether the compilation calls for recompiling or not. In the case of recompilation, processing step 41 et seq. shown on the right-hand side in FIG. 1 are sequentially executed. If recompilation is not involved, but the initial compilation is called for, a processing step 40 and the following steps shown on the left-hand side are sequentially executed.

In the following, a detailed description will be made of the contents of the individual constituent parts while elucidating the relations between the individual information contained in the compilation information 10 and the individual processings carried out in the compiler 6.

In FIG. 1, a numeral 12 designates an intermediate code obtained immediately after a syntax analysis, 40 designates a syntax analysis which is a processing for generating the intermediate code 12 from the source program 2, and a numeral 41 denotes an intermediate code updating processing for updating the intermediate code 12 on the basis of the program modification information 4.

A reference numeral 14 designates segment management information (information for managing or controlling the segments) containing the information concerning the split state of the intermediate code 12 and the information for each of the segments. A numeral 42 designates a splitting or segmentation processing for splitting the intermediate code 12 into segments and generating the segment management information 14. A numeral 43 designates a segment updating processing for updating the segment management information 14 in correspondence to the modification status of the intermediate code.

A numeral 16 designates inter-segment data flow information resulting from the analysis of data flow across the segments. A numeral 44 designates the inter-segment data flow analysis step for analyzing the data flow across the segments and generating the inter-segment data flow information 16.

A reference numeral 46 designates the processing groups which are the processing units resulting from temporary division of the optimization processing. The optimization processing is split or divided into n processing groups including the 1st processing group "1" to the n-th processing group "n". A reference numeral 18 designates the optimization information concerning the optimizations carried out in each of the processing groups 46. The optimization information is recorded, updated and utilized in each of the processing groups. It should be noted that the optimization information is generated in the initial compilation to be subsequently updated/utilized in the recompilation.

Reference numerals 45, 50, 51, 58, 60 and 61 designate main processings in each of the processing groups, wherein each of the objectives for the processings is limited to the one associated segment. Further, numerals 32, 30 and 20 designate information contained in the optimization information, and a numeral 17 designates intra-segment data flow information resulting from the data flow analysis limited to within the segment. The information can be recorded, updated and utilized independently in each of the segments.

A numeral 45 designates an intra-segment data flow analysis for analyzing the data flow limited to within the segment for generating the intra-segment data flow information 17. A reference numeral 50 designates an intra-segment optimization processing which is the processing for performing the optimization limited to within the segment to thereby record the information of the optimization 18. A reference numeral 30 designates the post-optimization intermediate code which is the intermediate code resulting from the optimization. A reference numeral 32 designates inter-segment data flow conditions which represent the conditions for the reusability of the post-optimization intermediate code within each segment. A reference numeral 20 designates program transformation information which represents the records of the rewriting of the intermediate codes as performed in the optimization carried out for the intermediate codes within the individual segments, i.e. the records of the individual program transformations. A reference numeral 51 designates a decision of the conditions for determining the processings to be performed for the individual segments upon recompiling. A reference numeral 58 designates the reuse of the post-optimization intermediate codes which represents the processing for reusing the post-optimization intermediate codes in the preceding compilation. A reference numeral 60 designates the reapplication of the preceding compilation program transformation which represents the processing performed for the purpose of reapplying the program transformation in the preceding compilation on the basis of the records of the program transformation 20 in the preceding compilation. A reference numeral 61 designates a program transformation ratio decision step for deciding the next processing depending on the ratio of the program transformations which could be applied in the reapplication of the preceding program transformation 60.

In connection with the processings performed within the processing groups 46, the intermediate code inputted to the i-th processing group is represented by the intermediate code 12 when i is "1", while being represented by the post-optimization intermediate code 30 contained in the (i-1)-th optimization information 18 when i is "2" or greater. The intermediate code as outputted is the post-optimization intermediate code 30 contained in the i-th optimization information 18.

Finally, a reference numeral 47 in FIG. 1 designates a code generation step which is a processing for generating the object code 8 from the post-optimization intermediate code in the last processing group 46.

In the above, the contents of the individual constituent processings of the instant embodiment have been elucidated.

Next, description will be made of the flows of control as well as flows of data among the constituent processings. However, since the control flow is well as the data flow have been already described in conjunction with the contents of the constituent processings except for those relevant to the Processing group 46, the following description is directed to the control flows and the data flows among the constituents within the processing group 46.

At first, as the processings to be performed in the first or initial compilation, the intra-segment data flow analysis 45 and the intra-segment optimization 50 are performed for each of the segments. In this regard, it should be mentioned that small circles attached before and after these two processings and upward heading arrows interconnecting these processings indicate that these two processings are executed repeatedly for each of the segments. These marks have the same meanings in the following description.

Next, as the processing in the recompilation, those processings shown as sandwiched between the small circles are performed for each of the segments. More specifically, at the condition decision step 51, it is decided which of the processings is to be performed within the segment. In accordance with the result of the decision, there is executed the post-optimization intermediate code reuse step 58 or alternatively the preceding program transformation reapplication step 60 and the reapplication ratio decision step 61 or alternatively the intra-segment data flow analysis step 45 and the intra-segment optimization step 50 which are same as those in the initial compilation. In the case where it is decided at the reapplication ratio decision step 61 that the ratio of reapplication of the program transformation is not sufficiently high, then the processings in the initial compilation are executed. In FIG. 1, broken lines with arrows indicate that the same processings as those in the initial compilation are also performed in the recompilation. The same applies in the following description.

The structure or arrangement of the instant embodiment shown in FIG. 1 will now be understood from the foregoing description.

Next, operations of the individual structural parts of the instant embodiment will be described with the aid of relevant flow charts.

Figure 3:
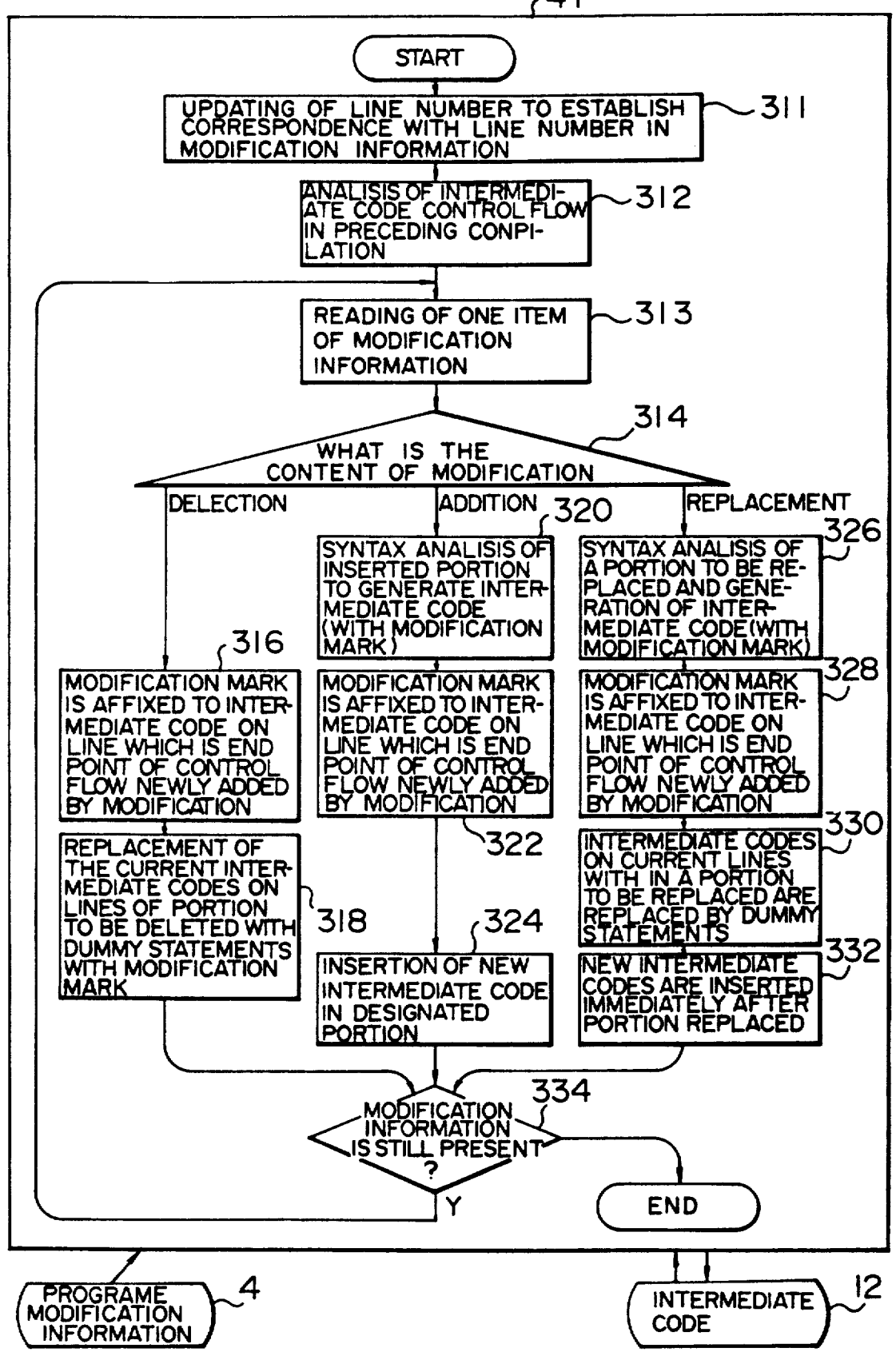
FIG. 3 is a flow chart for illustrating intermediate code updating processing.

FIG. 3 is a flow chart for illustrating the intermediate code update processing 41. In the intermediate code update processing 41, the program modification information 4 is inputted for thereby updating the pre-optimization intermediate code (i.e. the intermediate code before optimization) 12. The intermediate code updating method itself may be carried out in the same manner as is performed in the incremental compilation described hereinbefore in connection with the conventional techniques. Accordingly, the following description will be made of the operations involved in the intermediate code update processing 41 with emphasis being put on the processings to be executed additionally. According to the teaching of the invention adopted in the instant embodiment, a mark indicating the modification (i.e. the-modification mark 7)) is affixed to the intermediate code on the line which has undergone a modification by updating. In particular, it should be noted that when a line is deleted as a result of modification, the intermediate code of that line is not completely deleted, but is replaced by an intermediate code representing a dummy statement with the modification mark attached, to thereby indicate that the modification has been made. When the program control flow undergoes a change due to modification, the intermediate code 12 located at the end point of the newly generated control flow (e.g. designational statement such as GO TO statement) has the modification mark 70 appended thereto. This is for the purpose of suppressing the reapplication of the corresponding optimization when a jump takes place newly in the program transformation domain 24 (FIG. 2B) in a given optimization. By way of example, let's consider the program shown in FIG. 2B. When a branching to the fifth statement newly takes place due to the modification of another portion, the modification mark is affixed to the intermediate code of the statement on the fifth line, as a result of which the deletion of the common subexpression of "U+V" on the fourth and fifth lines is suppressed. Unless the optimization such as mentioned above is suppressed, occurrence of a jump to the fifth line will cause the program to be incorrect because the corresponding value is not set at the variable T1 which holds the value of the common subexpression, but is used at the fifth line. Parenthetically, the intermediate codes are consecutive in the form of a list on a statement basis and those of an unmodified statement remain unaltered even if addition, deletion or replacement should occur for the corresponding statement. Further, the intermediate codes inserted by the addition and replacement are stored at new addresses. For the statement literally deleted as well as the statement deleted as a result of replacement, an intermediate code indicating a dummy statement is written at the address for the old intermediate code. By structurizing and manipulating the intermediate code in this manner, the intermediate code addresses referred to by the segment management information 14 and the program transformation information 20 are protected against becoming incorrect. In particular, it must be pointed out that those intermediate codes of the start and last lines of the segment are always present.

Figure 23:
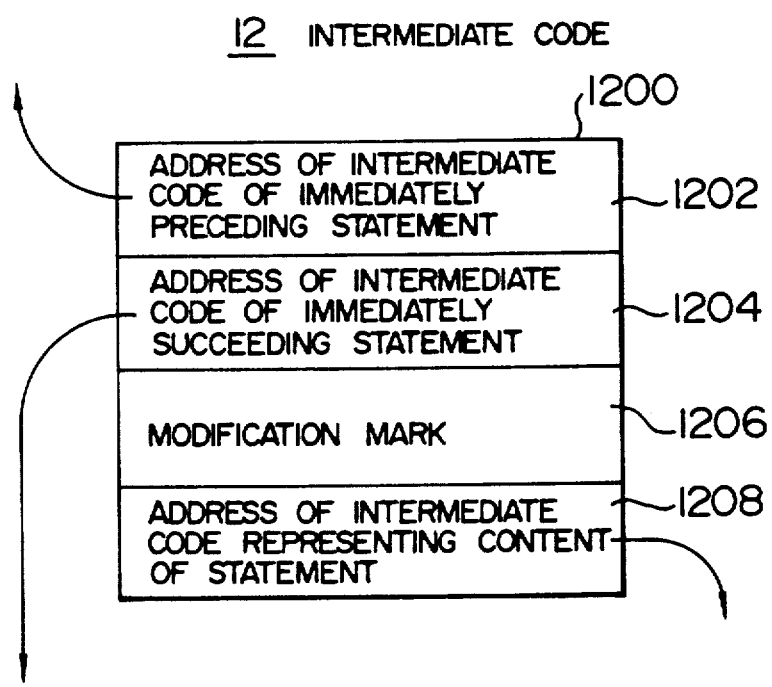
FIG. 23 is a diagram showing a structure of intermediate code (12)

The intermediate code may have a format or structure as shown in FIG. 23. In the figure, a reference numeral 1200 designates a start entry of the intermediate code of each statement. This entry includes an address 1202 of the intermediate code of an immediately preceding statement, and an address 1204 of an intermediate code of an immediately succeeding statement. (Concerning the format of the intermediate code representing the actual content of the statement, description is omitted herein.) Each of the individual statements is linked forwardly through the medium of the intermediate code address 1204 of the immediately succeeding statement and linked rearwardly through the intermediate code address 1202 of the immediately preceding statement. The data structure of this kind is known in the art and referred to as a bidirectional list. Accordingly, any further description concerning the access method will be unnecessary.

Now, description will be turned to the update processing of the intermediate code in the due order by reference to the flow chart shown in FIG. 3.

At a step 311, the line number in the intermediate code 12 is updated in advance so that correspondence can be identified between the line number used in the information for modification and the line number used in the intermediate code 12. The updating of the line number is the processing performed in correspondence with the modification of the intermediate code designated by 41 in the preceding recompilation and is executed in such a manner that, except for the lines containing dummy statements resulting from the deletion, the remaining lines are newly assigned with line numbers (line identification numbers) in sequential order. As a result of this, the numbers of the individual lines are replaced by the numbers which conform to the source program in the preceding compilation. At a step 312, the control flow analysis is conducted in precedence to the updating of the intermediate code so that alteration of the control flow due to modification can be detected. At a step 313, a first item of the program modification information 4 is read in. The program modification information 4 is the information describing or representing the contents of the modifications of the source program 2 after the preceding compilation and includes the data arrayed sequentially in a format as illustrated in FIG. 9. The contents of the modification include the deletion of a line, addition of a line and replacement of lines and indicate the deletion of the line within a certain range or domain as well as addition of a new line after a given line, and replacement of a line in a given domain with a new line, respectively, with reference to the line numbers in the program in the preceding compilation. This sort of program modification information 4 is well known in the art and is available from various source program management systems, such as that exemplified by SCCS in UNIX and others. At a step 314, a branch is made in dependence on the contents of the modification. More specifically, when the content of the modification indicates the deletion of a line, a branch is made to a step 316, while a branch is made to a step 320 when the modification is the addition of a line, and a branch is made to a step 326 when the modification indicates the replacement of line. At the step 316, the modification mark is affixed to the terminal line for the control flow added newly due to the modification, and this is then followed by a step 318 where the intermediate codes of the individual lines in the domain to be deleted are replaced by dummy statements with the modification mark. At a step 320, a portion to be inserted in the source program as contained in the program modification program 4 is subjected to syntax analysis to generate a corresponding intermediate code. At step 322, the modification mark is affixed to the terminal line for the control flow added newly due to the modification. At a step 324, the new intermediate code generated as a result of the syntax analysis at the step 320 is inserted at a designated location. At a step 326, a portion of the source program for replacement as contained in the program modification information is parsed to generate a corresponding intermediate code. At a step 328, the intermediate code on the end point of the control flow newly added by the modification has the modification mark appended thereto. At a step 330, the intermediate code on the line within a domain to be replaced is replaced by a dummy statement including the modification mark. At a step 332, the new intermediate code resulting from the syntax analysis at the step 326 is inserted immediately after a domain as designated. At a step 334, a decision is made as to whether the program modification information is still present. If so (i.e. if the answer of step 334 is "Y"), the processing makes return to the step 313. Otherwise, the processing comes to an end. The operation of the intermediate code update processing 41 is effectuated in the manner described above.

Figure 4A:
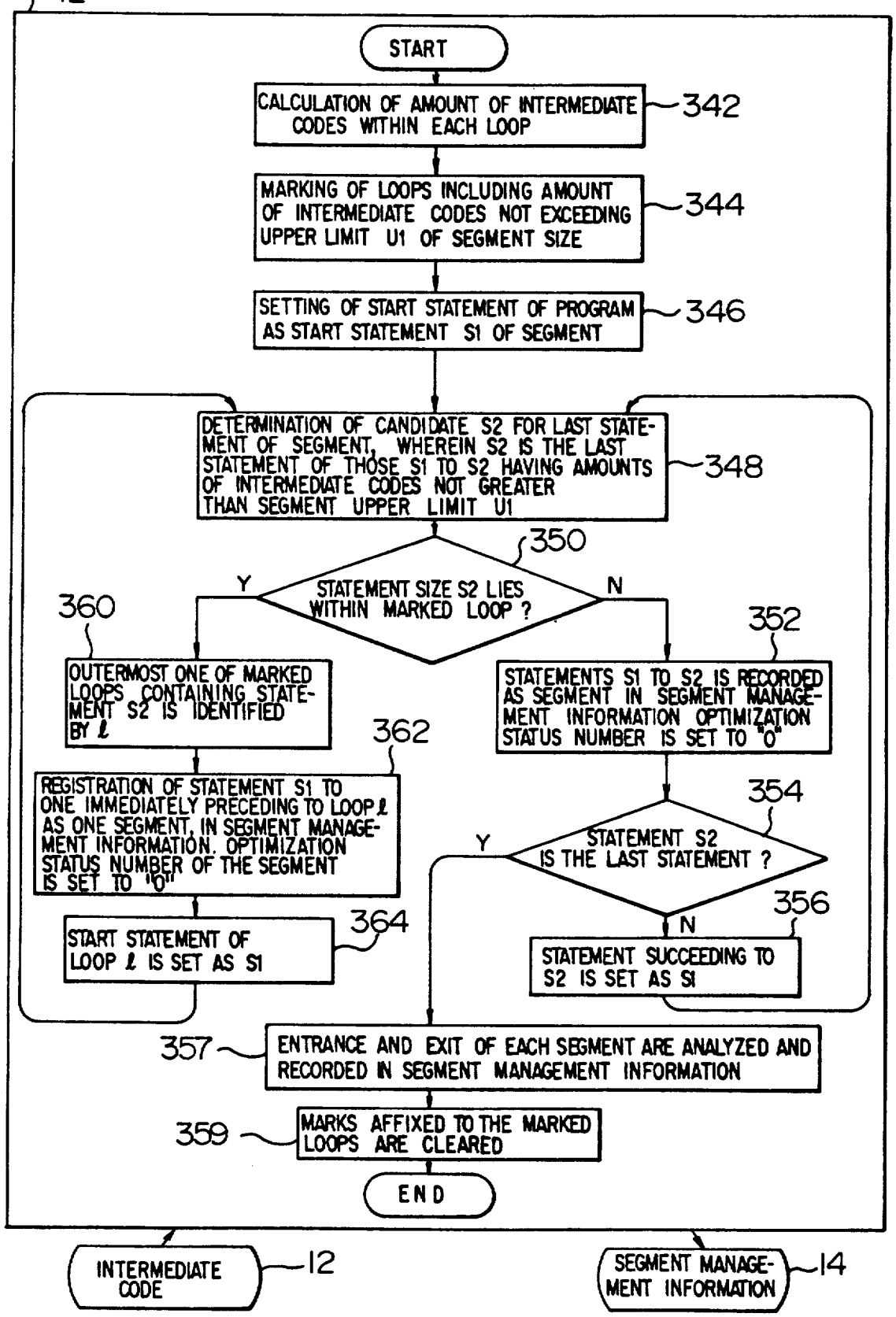
FIG. 4A is a flow chart for illustrating segmentation processing.

Next, a description will be made of the segmentation (i.e. splitting into segments the processing 42) with the aid of a flow chart shown in FIG. 4A. The segmentation 42 is the processing executed in the initial compilation for splitting or dividing an intermediate code into a series or row of portions or units (referred to as the segments) each within a predetermined size, whereon the situation in which the intermediate code is split into the segments is recorded as the segment management information. Upon segmentation, care should be taken so as to protect the loops in the program against being split, because otherwise the loop invariant move and the loop expansion which are of great significance for the optimization of the loop can no longer be carried out effectively for the loop as split, affecting adversely the effects of the optimization.

At a step 342, the amount of the intermediate codes within each of the loops contained in the program is calculated. At a step 344, those loops including the intermediate codes in an amount not exceeding an upper limit U1 of the segment size are marked.

The upper limit U1 of the segment size represents the upper limit value of the segment size in the segmentation (i.e. in the splitting into the segments). Selection of the segment size in a range of 10 to 50 lines will be appropriate since then even the innermost loop can scarcely be split. In case the effect of the optimization should nevertheless be degraded due to the segmentation, this problem may be coped with such measures which enable the user to designate the value of the upper limit Ui of the segment size or to input the command for inhibiting the segmentation in dependence on the loop. In the case of the instant embodiment, these measures are omitted from this description.

Figure 10:
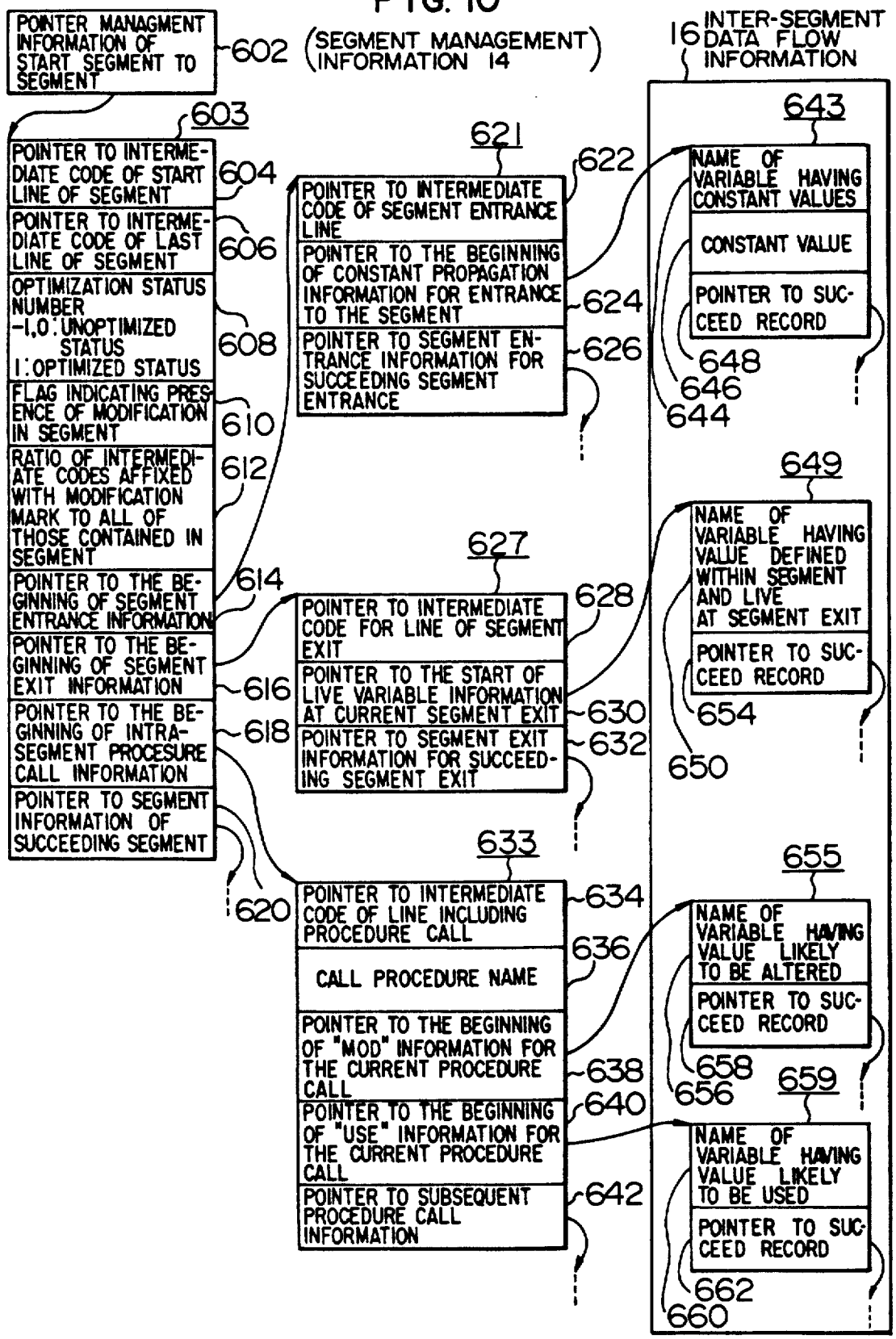
FIG. 10 is a view for illustrating the contents of segment management information and inter-segment data flow information.

At a step 346, the start statement of the procedure is set at S1 representing the start statement of the segment. At a step 348, a statement S2 representing a candidate for the last statement of the segment is determined. As S2, there is selected the one of the statements S1 to S2 that has the intermediate code of a size which is smaller than the upper limit size U1 of the segment and is at maximum. At a step 350, a decision is made as to whether the statement S2 lies within the loop as marked. When the answer in this step 350 is true, the processing proceeds to a step 363 and if otherwise (i.e. when the answer is false), the processing proceeds to a step 352. At the step 352, unification of the intermediate codes of the statements S1 to S2 to one segment is recorded as the segment management information 14. The contents of the segment management information are illustrated in FIG. 10, details of which will be described later on. It should however be noted here that as the optimization status number 608 contained in the segment management information, "O" is set. The optimization status number 608 represents the status or state of optimization of the segment. More specifically, the optimization status number 608 assuming the value of "1" indicates that optimization has already been done. On the other hand, values of "−1" and "0" of the optimization status number represent that the optimization is not completed yet. The difference in the meaning between the values of "−1" and "0" is as follows. When the optimization status number is "0", this means that the optimization has to be tried again starting from the first processing group 46 in current recompilation. On the other hand, the value "−1" of the optimization status number indicates that, because of degradation in the ratio of the reapplication of optimization at the intermediate processing group 46, the optimization needs to be tried again in the succeeding processing in current recompilation, and starting from the initial processing group 49 in the next recompilation.

At a step 354, a decision is made as to whether the statement S2 is the last statement of the procedure. When the answer of this decision step is true (affirmative or Y), the processing proceeds to a step 357. If otherwise (i.e. if false or negative), the processing proceeds to a step 356. At the step 356, the statement following to S2 is set on S1, whereupon the step 348 is regained and the succeeding processing steps are repeated. At the step 357, the entrance and exit of each segment are determined, the result of which is recorded as a part of the segment management information. With the phase "entrance of segment or segment entrance", it is intended to refer to a part to which a jump is made from the control of another segment. On the other hand, the exit of a segment or segment exit refers to a part from which the control jumps to another segment. Next, at a step 359, the marks affixed to the loops in which the segment size is smaller than the upper limit U1 are cleared, whereupon the segmentation processing 42 comes to an end.

At a step 360, the outermost one of the marked loops containing the statement S2 is searched and identified by l. At a step 362, unification of the statements S1 to the one immediately preceding the loop l into one segment is registered in the segment managing information 14. At this segment, the optimization status number 608 contained in the segment managing information 14 is set to the value "0". At a step 364, the start statement of the loop l is set to S1, whereon the step 348 is resumed to allow the processing described above to be repeated.

Next, referring to FIG. 10, a description will be made of the segment management information 14 which is prepared by the segmentation (i.e. splitting to segments) 42. In FIG. 10, there are shown at the left-hand side a pointer 602 to the segment management information of the start segment and the segment management information 603 for each segment, while shown at a mid portion of the figure are segment entrance information 621, segment exit information 627 and procedure call information 633. Finally, shown on the right-hand side is the inter-segment data flow information 16 which is generated through inter-segment data flow analysis.

The segment management information 603 of the individual segments are linked together by the pointers 620. A reference numeral 604 designates a pointer to the intermediate code of the starting line of the segment, a numeral 606 designates a pointer to the intermediate code of the last line of the segment, and a numeral 608 designates the optimization states number mentioned previously. A reference numeral 610 designates a flag indicating whether the segment contains a modification or not. In the initial compilation, this flag 610 is cleared. A numeral 612 designates the ratio of the intermediate code to which the modification mark is affixed to those contained within the segment. In the initial compilation, this ratio is set to "0". A numeral 614 denotes a pointer to the start record of segment entrance information 621, and a numeral 616 denotes a pointer to the start record of segment exit information 627. Further, a numeral 618 denotes a pointer to the start record of the information, concerning a procedure calls in the segment 633, and 620 denotes a pointer to the segment management information of the succeeding segment.

The segment entrance information 621 includes a pointer to the intermediate code at the segment entrance line 622, a pointer 624 to the start 643 of the constant propagation information at the segment entrance, and a pointer 626 to the segment entrance information of the succeeding segment entrance. It should be mentioned that the value of the pointer 624 is set through inter-segment data flow analysis 44.

On the other hand, the segment exit information 627 includes a pointer 628 to the intermediate code of the line at the exit of the segment, a pointer 630 to the start 649 of live variable information at the exit of the above-mentioned segment and a pointer 632 to the segment exit information of the succeeding segment exit. In this conjunction, it should be mentioned that the value of the pointer 630 in set through the inter-segment data flow analysis 44.

The procedure call information in the segment 633 includes a pointer 634 to the intermediate code of the line containing the procedure call, the name 636 of the procedure to be called, two pointers 638 and 640 to the inter-procedure data flow information for the procedure call, and a pointer 642 to the information about the succeeding procedure call. Parenthetically, the values of the pointers 638 and 640 are set through the inter-segment data flow analysis 41.

Figure 13:
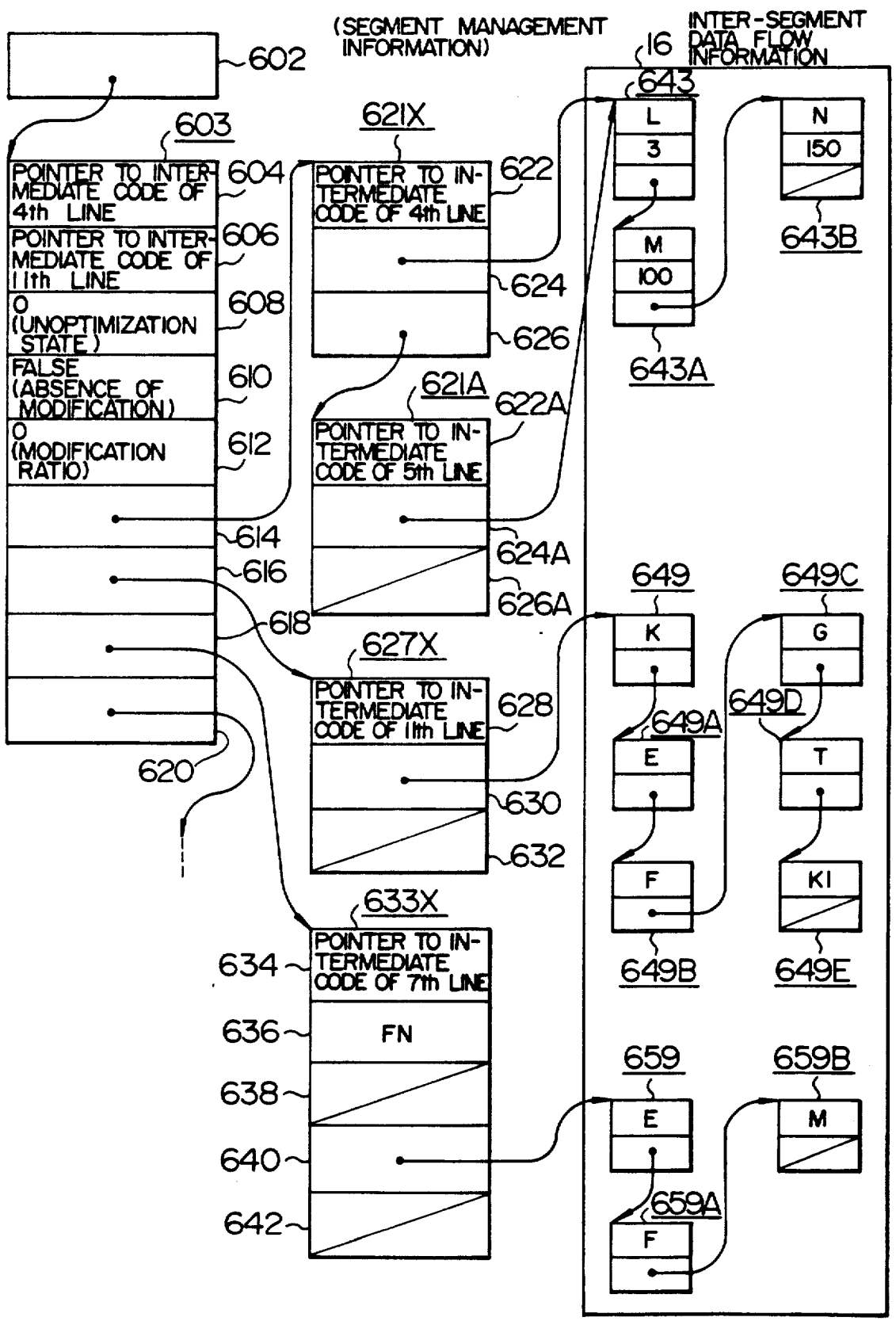
FIG. 13 is a diagram for illustrating the segment management information and inter-segment data flow information in an example of application of the invention.

FIG. 12B shows an example for illustrating how the segments are split as a result of execution of the segmentation 42 in the case of a program shown in FIG. 12A, and FIG. 13 is a schematic diagram for illustrating the segment management information 14.

FIG. 12A is a view showing an example of the source program 2 to be inputted. This program is written in FORTRAN language and represents a source program of a subroutine named "SUB1". In FIG. 12A, a reference numeral 99 denotes the line numbers assigned to the lines of the source program in the serial order. There are included the outermost loops which extend from the 4th to the 22nd line (loop D010) and from the 23rd to the 28th line (loop D060), respectively, wherein the loop D010 includes internally a loop D020 extending from the 8th to the 10th line, a loop D030 extending from the 14th to 16th line, a loop D040 extending from the 17th to the 21st line and a loop D050 extending from the 18th to 20th line.

FIG. 12B shows the intermediate codes 12 of the source program shown in FIG. 12A. For facilitating the understanding of this invention, the intermediate codes are expressed in the form approximating the source program. Although the individual statements are linked together in the form of lists as mentioned hereinbefore, illustration thereof is omitted. In the intermediate codes 12, the portions each enclosed by a bracket "[]" represent array address calculating expressions in which a main difference of the intermediate code 12 shown in FIG. 13B from the source program 2 can be found.

A specification statement is described from the first to the third lines. Since the specification statement is not split into segments, the corresponding intermediate codes are not shown. The modification of the specification statement exerts an influence on all the intermediate codes. Accordingly, when the specification statement is modified, all the intermediate codes resident in the execution part have to be reoptimized. Such reoptimization can however be easily avoided by attaching the modification mark to those lines which refer to the variable/array in the statement having the content modified through the intermediate code updating 41. Accordingly, handling of the statement is omitted from the description. As to the size of the segment, it is believed that about 10 to 50 lines are required. In the case of the illustrated example, the upper limit U1 of the segment size is set at eight lines for facilitating the understanding of the segmentation. Accordingly, except for the loop D010, the loop can be included in the single segment and is marked. In contrast, the loop D010 is not marked and is split into segments.

The segment registered first upon the segmentation processing 42 (i.e. the segment 1) includes eight lines from the fourth to eleventh line. Since the last line of this segment is not included in the marked loop, it is handled intact as the segment. Next, eight lines including the 12th to 19th lines constitute a candidate for the second segment. However, since the 19th line is included in the marked loop D050, it can not be handled intact as the segment, but the lines up to the 16th line immediately preceding the outermost loop D040 of those marked and surrounding the 19th line constitute a segment (i.e. segment 2). Thus, the loop D040 of such size which can be included in one segment can evade the segmentation. Subsequently, eight lines from the 17th to 24th line constitute a candidate for the third segment. However, since the 24th line which is included in the marked loop D060 can not be a part of the segment as it is, the lines up to the 22nd line located immediately before the loop D060 constitute one segment (i.e. segment 3). Finally, all the remaining lines constitute one final segment (i.e. segment 4).

FIG. 13 is a view illustrating the segment management information 14 for the segmentation mentioned above. For simplification only the information for the segment 1 is illustrated. In the figure showing the segment management information 603 for the segment 1, a reference numeral 604 denotes a pointer to the intermediate code of the fourth line which is the last line of the segment, and a numeral 606 denotes a pointer to the intermediate code of the eleventh line which is the last of the segment. In blocks 608, 610 and 612, there are placed the values "0", "False" and "0" for the initial compilation, respectively.

A pointer to the start 621X of the segment entrance information is placed at 614. Reference symbols 621X and 621A denote the segment entrance information, respectively, which represents the information about the segment entrance on the fourth line and the segment entrance on the fifth line, respectively. The fourth line defines the start of the executable part of the procedure. Since the procedure is generally called several times, it is regarded that an indirect control flow exists from the last line to the start line of the procedure. Thus, the fourth line defines the entrance of a segment. Similarly, the fifth loop constitutes the entrance of a segment because a control flow thereto exists from the 22nd line which is the last line of the loop D010 upon repeated processing thereof.

A pointer to the start 627X of the segment exit information is placed at 616. In the case of the segment 1, the segment exit is located at the 11th line.

A pointer to the start of the information about the procedure calls in the segment is placed at 618. In the case of the segment 1, a function FN is called at the 7th line. Accordingly, the correspond information is set at 633X.

From the above description, the segmentation processing 42 can now be understood.

Next, the operation of the segment update processing 43 will be described by reference to FIG. 4B. The segment updating 43 is the processing to be performed at the time of recompilation for updating the segment management information in accordance with the modification of the intermediate codes 12. In the segment update processing 43, the optimization status numbers 608 of the individual segments are updated to determine whether or not the optimization is to be redone from the beginning upon recompiling. Further, the segment whose size becomes excessively small as a result of the modification is merged with another segment, while the segment having its size increased excessively is split, to thereby maintain the segments in proper sizes. In the segment update processing 43, the updating of the segment management information 14 is the major processing, which may be attended by alteration of the modification mark of the intermediate code in some cases, as will be described in detail later on.

At a step 371, the segment management information 14 and the intermediate code 12 are referred to for detecting the intermediate code which is not placed within the existing segments but is inserted between the adjacent segments, whereon the intermediate code(s) as inserted are registered as the new segment(s) in segment management information 14. At that time the optimization status number 608 is set to "−1" which indicates at this point that the optimization need to be redone from the beginning.

Steps 372 to 376 are repeated for performing the processing for all the segments. In other words, the processing from the steps 372 to 376 is executed for each of the segments. More specifically, at the step 372, branching is made in dependence on the value of the optimization status number 608 of the segment of concern. When the value of the optimization status number 608 is "−1", the processing branches to the step 373, while it branches to the step 375 when the value of the optimization status number 608 is "0". Further, when the value of the optimization status number 608 is "1", the processing branches to the step 376. At the step 373, the optimization status number 608 of the segment is set to "0", indicating that the optimization must be redone from the beginning. At the step 374, all the intermediate codes 12 within the segment have the modification mark affixed thereto. The purpose of affixing the modification mark to all the intermediate codes within a segment is to make it possible to calculate correctly an intra-segment modification ratio 612 when the segment is merged with another segment. Of course, the affixing of the modification mark to the intermediate codes 12 at this step may be omitted so far as the calculation is so devised that the intra-segment modification ratio 612 can be determined correctly without need for the modification mark. At the step 375, the optimization status number 608 of the segment is set to "1", indicating that in place of the optimization processing, the optimization information 18 is reused. At the step 376, it is decided whether there exist the intermediate codes with the modification mark among those included in the segment of concern, whereon the ratio of the intermediate codes affixed with the modification mark is entered in the segment management information 14 at 610 and 6L2. When the ratio of the intermediate codes with the modification mark is great and exceeds a predetermined upper limit value, the optimization status number 608 is set to "0" to thereby indicate that the optimization must be redone from the beginning.

At the step 377, a segment having a size smaller than the lower limit value L thereof is merged with the immediately preceding or succeeding segment. The lower limit L of the segment size has a value determined previously. For merging of the segment, there are available two destination segments, i.e. the immediately preceding segment and the immediately succeeding segment. In that case, the segment which is smaller in segment size and which has the greater intra-segment modification ratio should preferably be selected. The optimization status number 608 of the segment resulting from the merging is set to "1" provided that the optimization status number 608 of the destination segment is "1" and that the modification ratio of the segment resulting from the merging is sufficiently small, to thereby allow the optimization information 18 of the destination segment to be reused. Otherwise, the optimization status number 608 of the segment generated by the merging is set to "0", to thereby indicate that the optimization must be redone from the beginning.

At a step 378, any segment having a size greater than the upper limit U2 is split. More specifically, the intermediate code 12 of the segment of such size is split into a plurality of segments each having a segment size smaller than U1. The splitting method to this end is carried out similarly to the segmentation processing 42 with the only difference being that the intermediate code 12 to be split is not the whole of the intermediate codes involved in the procedure. The optimization status number 608 of the segment resulting from the split mentioned above is set to "0" and registered in the segment management information.

At a step 379, the modification mark is eliminated from all the intermediate codes in the segments having the optimization status number 608 set at "0".

At a step 380, the entrance as well as the exit of the segment are analyzed again to update the corresponding information contained in the segment management information 14.

In the segmentation processing 42 and the segment update processing 43, the values U1 aid U2 are used as the upper limits of the segment size with the value L being used as the lower limit of the segment size. In this conjunction, it is to be noted that the upper limit U1 of the segment size represents the initial upper limit of the segment size while the upper limit U2 of the segment size represents an upper limit value which results from the addition of an allowable increase in the segment size due to the modification to the initial upper limit U1. In order that the optimization information 18 can be effectively utilized, the following relation should apply among the upper limits and the lower limit.

$$L < < U1 < U1 + aL \times U2$$

where $a$ represents approximately a desired number of times the optimization information 18 is to be reused and ordinarily lies within a range of 2 to 10.

Figure 4B:
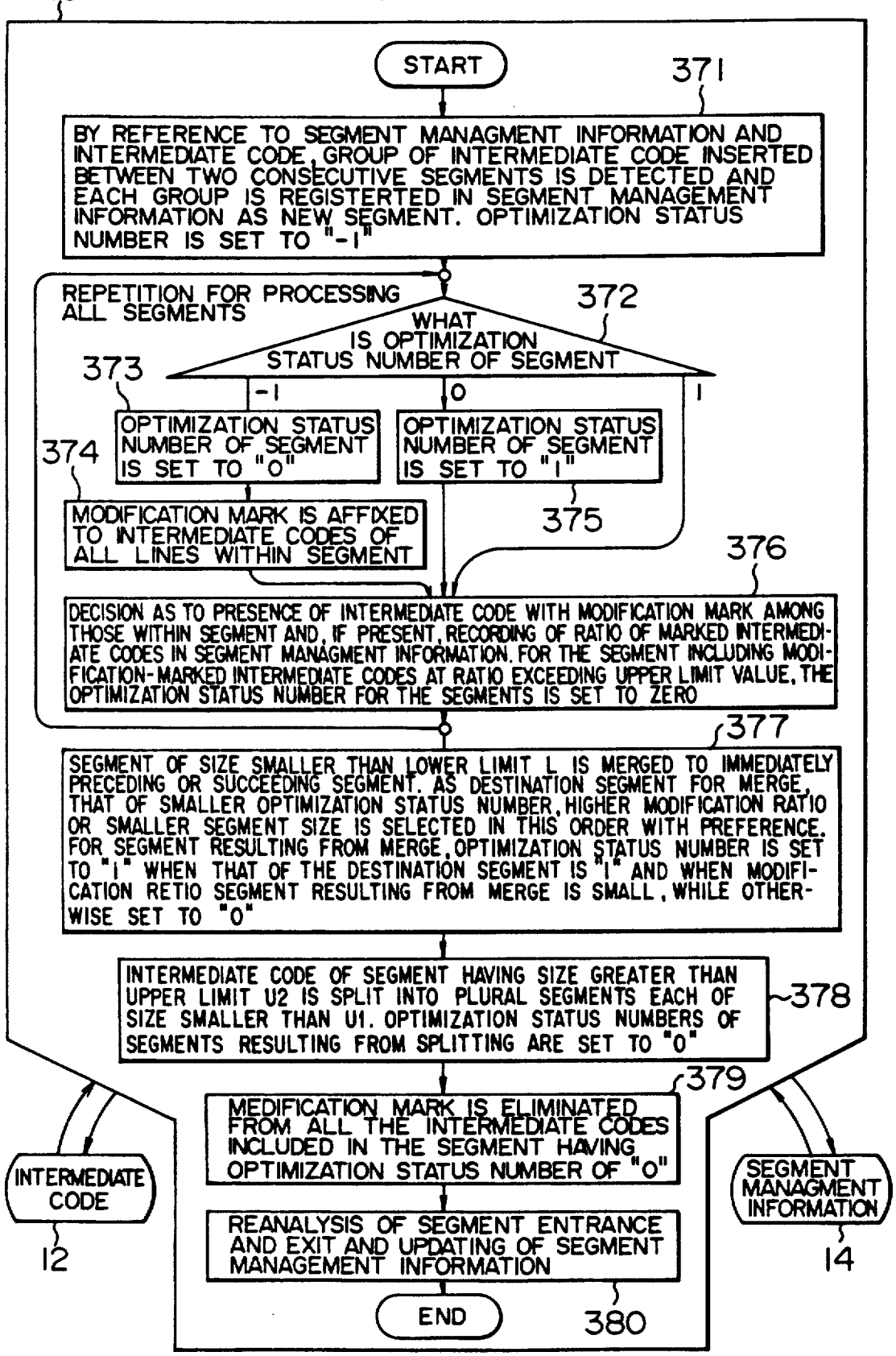
FIG. 4B is a flow chart for illustrating a segment updating processing.

In the above, a description of the segment updating 43 has been made by reference to FIG. 4B.

Figure 18A:
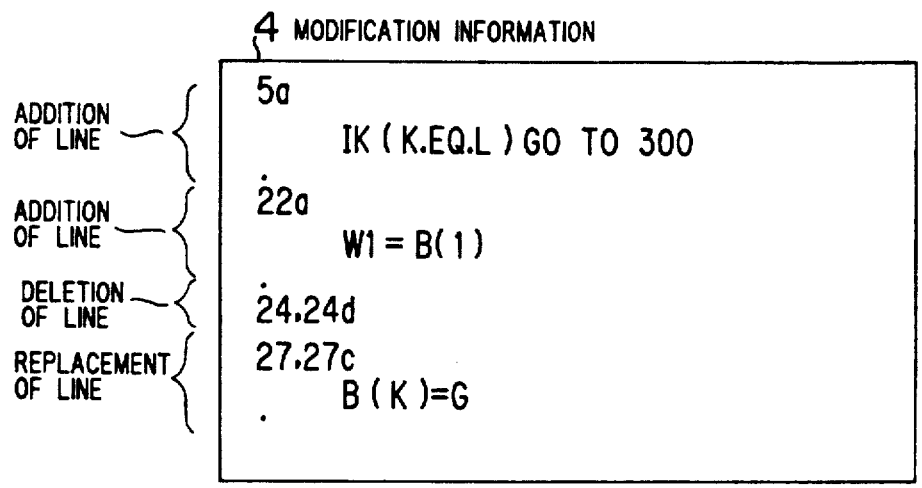
FIG. 18A shows an example of modification information in the recompilation in an example of application of the invention.

Now, an example of the intermediate code updating 41 and the segment updating 43 which are the processings involved in the recompilation will be described by reference to the program shown in FIG. 12A by way of example, and on the assumption that the modification information 4 of the contents illustrated in FIG. 18A is given.

The modification information 4 shown in FIG. 18A indicates that an IF statement is to be inserted following the fifth line, an assignment statement to W1 is to be inserted following the 22nd line, the 24th line is to be deleted and that the 27th line is to be replaced by another assignment statement. As a result of the intermediate code update processing 41 executed in the course of recompilation, the intermediate code 12 is updated in a manner as illustrated in FIG. 19.

Referring to FIG. 19, a reference numeral 70 denotes a column for the modification mark. More specifically, the line affixed with a mark "X" in the column 70 is the line having the modification mark attached thereto. The lines having the modification mark affixed thereto include six lines, i.e. the line inserted immediately after the line "5", the line "7" which is the end point of a control flow newly added due to the insertion of the line mentioned above, the line newly inserted immediately after the line "22", the line "24" having a dummy statement due to deletion, the line having a dummy statement due to replacement and the inserted line.

The manner in which the segment is split is not appreciably different from that in the initial compilation (FIG. 12B). However, the line inserted after the line "22" and thus interposed between the segment 3 and the segment 4 is merged with the segment 4 for the reason that segment 4 has a greater intermediate code modification ratio 612 than the segment. Further, it will be noted that the optimization status number 608 is "1" in the case of the segment 1 to the segment 3, indicating the reuse of the optimization information 18. However, the optimization status number of the segment 4 is "0" because of a great amount of modification, indicating that the optimization be redone from the beginning.

Figure 5:
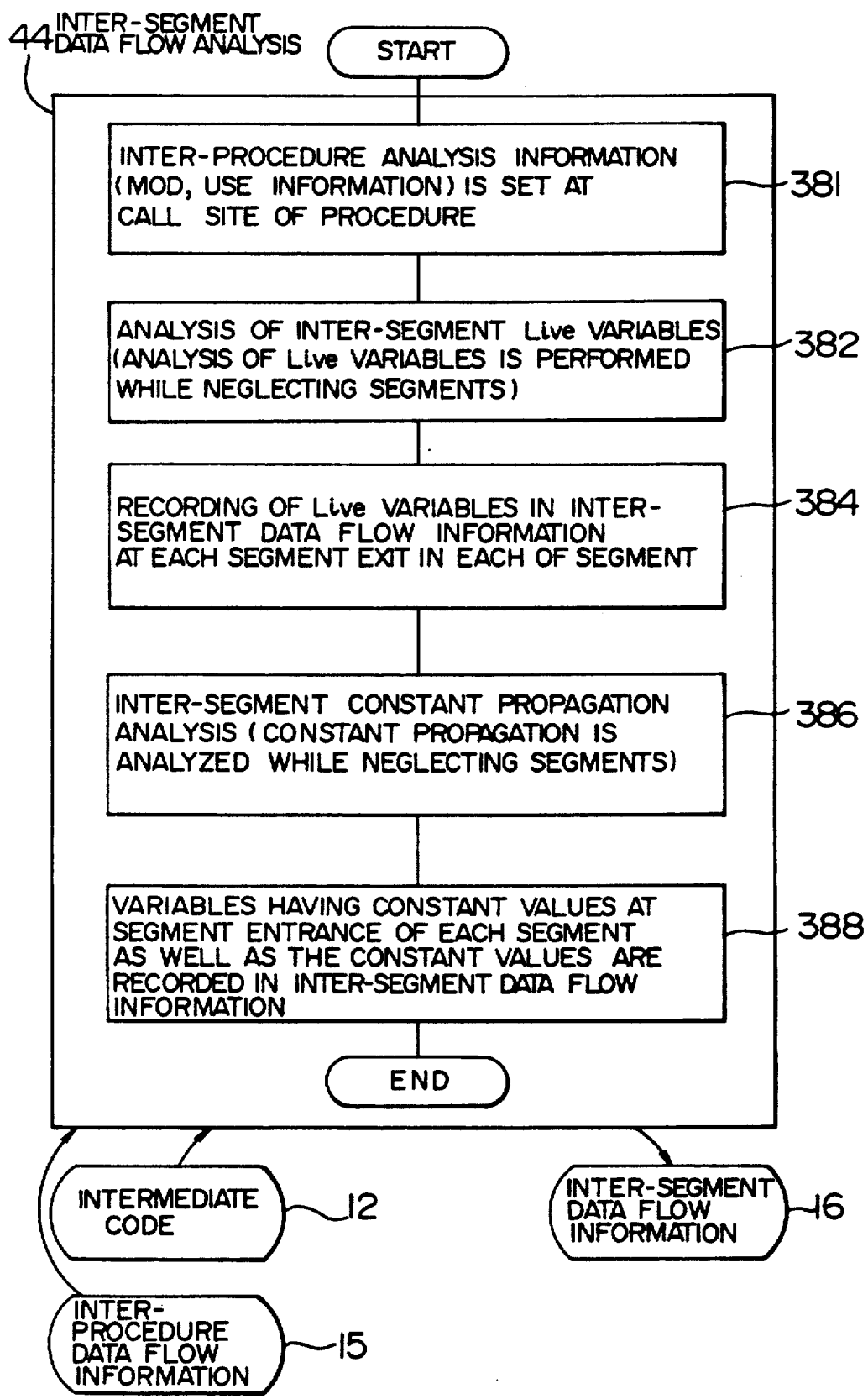
FIG. 5 is a flow chart for illustrating processing flow in inter-segment data flow analysis.

Next, a description will be made of processing flow in the inter-segment data flow analysis 44 by reference to FIG. 5. The inter-segment data flow analysis is a processing according to which the data flow analysis is performed across the segments on the basis of the intermediate codes 12, wherein the result of the analysis is registered as the inter-segment data flow information 16. The inter-segment data flow analysis is carried out in the initial compilation as well as in the recompilation. The inter-segment data flow information 16 is of such content as shown in FIG. 10 on the right-hand side. More specifically the inter-segment data flow information 16 contains names 644 of variables having constant values at the segment entrance and the values 646 thereof, names 656 of variables which are live at the segment exit and which are defined within the segment, names 656 of variables having values likely to be modified upon procedure call, and names 660 of variables having values likely to be used upon procedure call. Each of the information enumerated above is collectively referred to as the constant propagation information, live variable information, MOD information and the USE information, respectively.

At a step 381 based on the inter-procedural data flow information 15 (MOD information and USE information), the information 633 at call sites of procedure as a part of the inter-segment data flow information 16 is set. Since the method of analyzing the inter-procedural data flow information 15 is known in the art, it is assumed that the information has already been updated before the recompilation starts.

At a step 382, an inter-segment live variable analysis is performed. (In practice, the live variable analysis may be performed throughout the whole of procedure while neglecting the segments.)

At a step 384, the names 650 of the live variables defined within the segments are recorded in the inter-segment data flow information 16 for each of the segment exits.

At a step 386, the inter-segment constant propagation is analyzed. (In practice, the constant propagation analysis may be performed over the whole of the procedure while neglecting the segments. At that time, the inter-procedure constant propagation information contained in the inter-procedural data flow information 15 is also made use of.)

At a step 388, the names 644 of the variables having constant values as well as the values are recorded in the inter-segment data flow information 16 for each of the segment entrances.

Figure 18B:
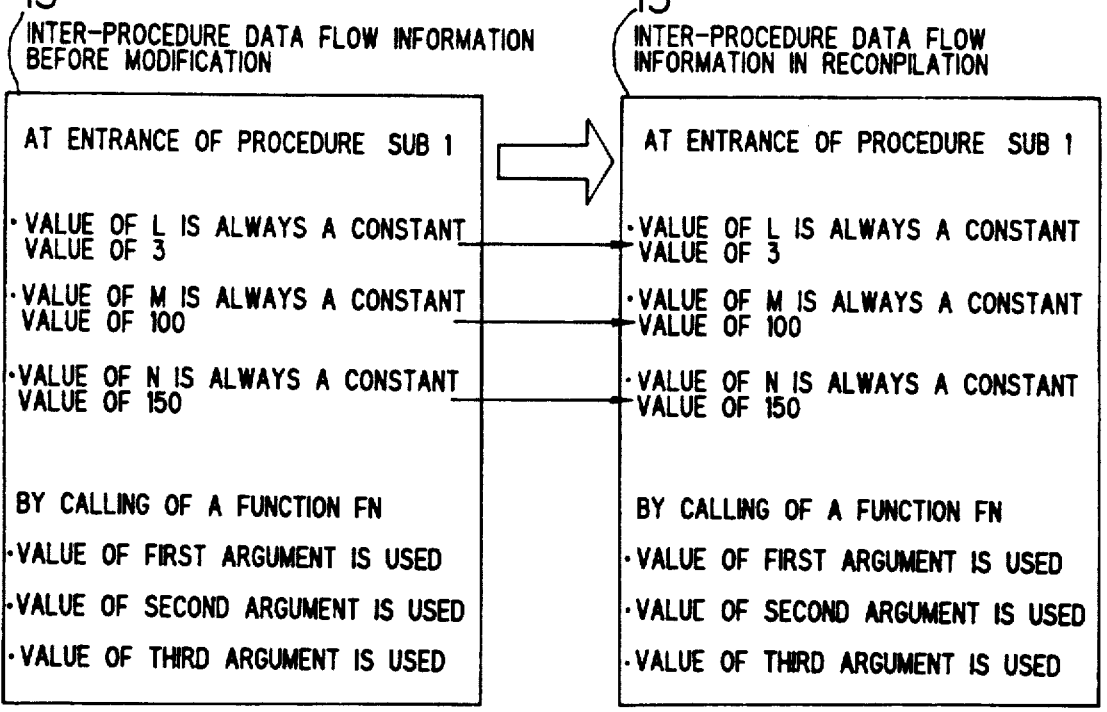
FIG. 18B shows an example of change in the inter-procedure data flow information in the recompilation in an example of application of the invention.

An example of the inter-segment data flow information 16 for the segment 1 at the time of the initial or first compilation of the program shown in FIG. 12A is shown in FIG. 13 on the right-hand side. It is however assumed that the inter-procedural data flow information 15 in the initial compilation is such as illustrated in FIG. 18B at the left-hand side. Of the inter-segment data flow information 16 shown in FIG. 13 on the right-hand side, the constant propagation information (643, 643A, 643B) and the information of the call sites of procedures (659, 659A, 659B) correspond directly to the inter-procedural data flow information 15 shown in FIG. 18B on the left-hand side. For the live variable information, the names K, E, F, G, T and K1 of the variables which ar live have already been set at the exit of the segment.

In the foregoing, operations except that of the processing group 46 have-been described.

In the following, a description will he made in detail of the processings performed within the processing groups 46. It should be recalled from the outline of the processing in the processing group 46 made by reference to FIG. 1 that in the initial or first compilation, the intra-segment data flow analysis 45 and the intra-segment optimization processing 50 are performed on a segment-by-segment basis to thereby generate the optimization information 18, while upon recompilation, the reuse of the post-optimization intermediate code (58), or the reapplication of the preceding program transformation (60) or the intra-segment data flow analysis (45) and the intra-segment optimization (50) are selectively performed in dependence on the result of decision of the conditions 51. In the post-optimization intermediate code reuse processing 58, the post-optimization intermediate codes 30 in the preceding compilation are reused, whereby the intra-segment data flow analysis processing 45 and the intra-segment optimization processing 50 are rendered unnecessary, whereby the compilation processing as a whole can significantly be reduced. In the preceding program transformation reapplication processing 60, the detection of the objectives for optimization and determination of the optimization method which are required for the intra-segment optimization 45 is also rendered unnecessary and it is sufficient to make only the decision as to the reapplicability of the optimization carried out in the preceding compilation, which also leads to reduction of the compilation processing. However, in the preceding program transformation reapplication processing 60, a decision is made as to whether the ratio of the reapplication of optimization is high or not (at the step 61) by taking into account the fact that the low ratio of the reapplication of optimization may give rise to degradation in the run performance of the object program 8 as generated. When the answer of the above decision is negative or false, the processing involved in the initial compilation is redone. The above is the outline of the processing performed within the processing group 46.

In the following, an operation performed within the processing group 46 will be described in more detail by reference to FIG. 6 which illustrates in more detail the operation performed in the processing group 46.

Figure 6:
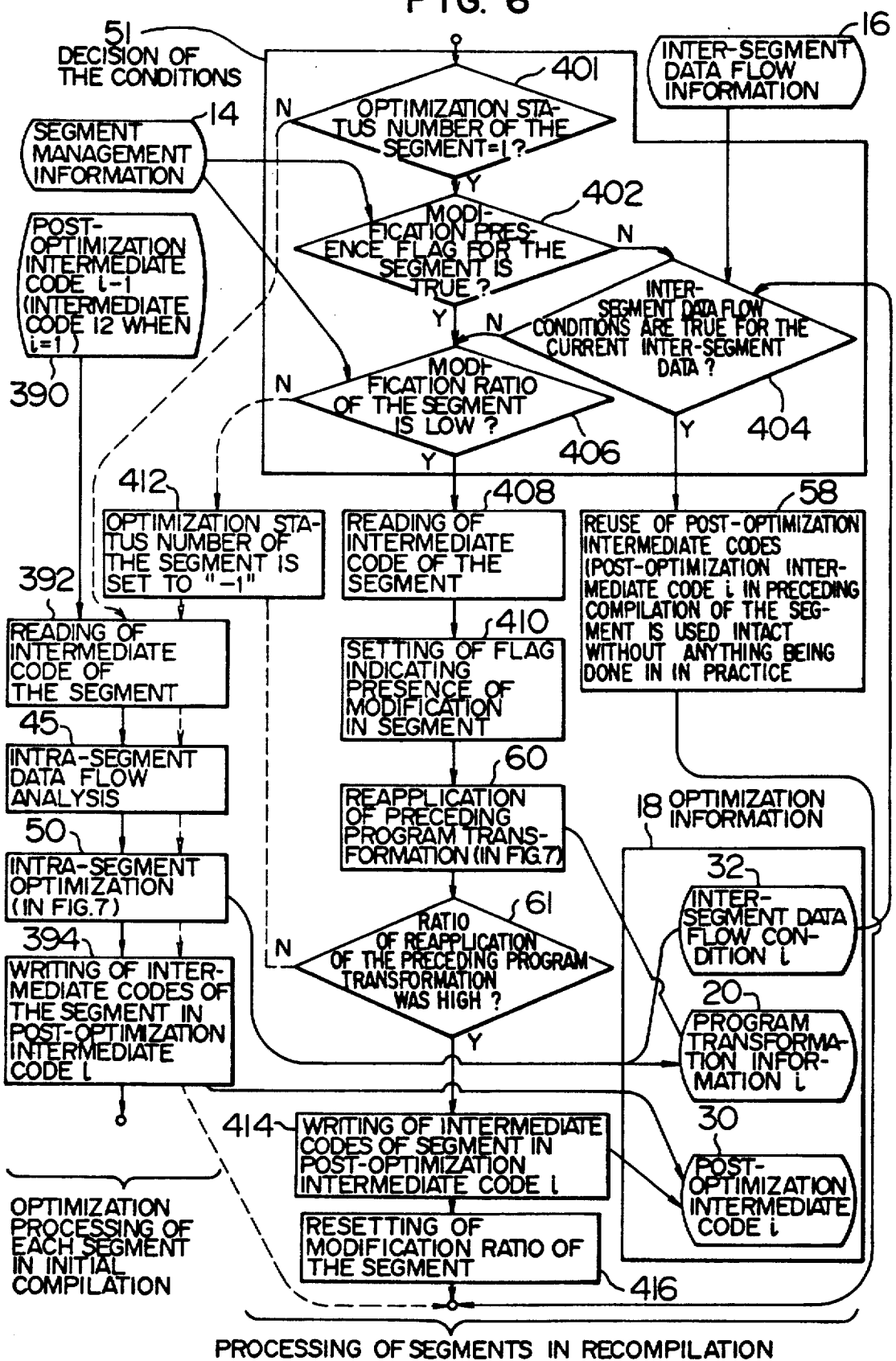
FIG. 6 is a flow chart for illustrating in detail operations performed in processing groups.

More specifically, the flow chart shown in FIG. 6 serves to illustrate the processings performed in the i-th processing group 46, wherein the flow chart including steps 392, 45, 50 and 394 shown on the left-hand side in FIG. 6 serves to illustrate in more detail the processings performed for each of the segments upon first or initial compilation in the processing group 46. Further, a flow chart including steps 401, 402, 404, 406, 412, 408, 410, 58, 60, 61, 414 and 416 shown on the right-hand side serves to illustrate in more detail those processings performed for each of the segments upon recompilation in the processing group 46. It should be added that data used in the i-th processing group 46 is also shown in FIG. 6. In the figure, a reference numeral 14 denotes the segment management (control) information to be inputted which is susceptible to updating. A reference numeral 16 denotes the inter-segment data flow information to be inputted. A numeral 390 denotes intermediate codes to be inputted to the processing group. In the start or first processing group (i.e. the group for which i=1), the intermediate codes are the pre-optimization codes 12 (i.e. the intermediate codes before being optimized) and otherwise (i.e. in the groups for which i is not 1) the intermediate codes are the post-optimization intermediate codes (i.e. the intermediate codes undergone optimization processing) 30 outputted from the immediately preceding processing group. A reference numeral 18 denotes optimization information for the i-th processing group 46 which contains the inter-segment data flow condition 32, the program transformation information 20 and the post-optimization intermediate codes 30 which are recorded, utilized and updated. (The content of the optimization information will be described in more detail later on.)

At a step 392, the input intermediate code 403 for the segment being processed is fetched and written in a memory. At a step 45, the intra-segment data flow analysis is performed. (It is to be mentioned that the intra-segment data flow information 17 is omitted from the drawings for evading complexity.)

At a step 50, the intra-segment optimization is performed, whereby the intermediate code in the memory is rewritten while the inter-segment data flow condition 32 and the program transformation information 20 are generated and recorded. (The processing for the intra-segment optimization 50 will be described in more detail later on.)

At a step 394, the intermediate code in the memory for the segment being processed is written in as the post-optimization intermediate code 30.

Through the procedure mentioned above, the intra-segment optimization 50 is performed for the intermediate code included in the segment being processed, whereby the optimization information 18 for this segment (i.e. the inter-segment data flow condition 32, the program transformation information 20 and the post-optimization intermediate code 30) is generated and recorded.

Next, the description will be directed to the processings for the individual segments in the recompilation.

It should first be noted that the steps 401, 402, 404 and 406 are to illustrate in more detail the condition decision step 51 shown in FIG. 1. In the step 401, it is decided whether or not the optimization status number 608 is "1", i.e. whether or not the optimization has been carried out in the preceding compilation. When the answer of this decision step 401 is true (Y), the processing proceeds to the step 402. If otherwise or false, the steps 392, 45, 50 and 394 involved in the initial compilation processing are executed. At the step 402, a decision is made as to whether the flag 610 indicating modification of the segment is true or not. It true, the processing proceeds to the step 406, and otherwise to the step 404. At the step 404, it is decided whether or not the inter-segment data flow condition 32 for the segment being processed is true for the inter-segment data flow information 16. If true, the processing proceeds to the step 58 where the post-optimization intermediate code is reused. If false, the step 406 is executed, where a decision is made as to whether or not the modification ratio 612 of the segment is low. If the decision at the step 406 is true, the step 408 is then executed, where the program transformation reapplication 60 is performed. On the other hand, when the decision at the step 406 is false, the step 412 is executed where the optimization status number of the segment under consideration is set at "−1", which is then followed by execution of the steps 392, 45, 50 and 394 which are the processing steps performed in the initial compilation. Setting of the optimization status number 608 of the segment to "−1" is for the purpose of indicating that the processings involved in the initial compilation are to be performed for this segment in the processing groups 46 which follow and that the optimization is to be redone from the beginning in the succeeding compilation. In this manner, the object program 8 corresponding to this segment is protected against any appreciable degradation in the run performance.

In dependence on the result of the processings performed at the condition decision 51, the procedure branches to the post-optimization intermediate code reuse 58 or alternatively to the preceding program transformation reapplication 60 or alternatively to the processing involved in the initial compilation. Incidentally, although the reference for the decision as to the modification ratio at the step 406 is not defined, it is believed that the modification ratio may be regarded to be small for the modification of the ratio in a range of 10% to 20%. Further, it is preferred for realizing a more appropriate decision to take into consideration that the modified portion is narrowly localized or widely distributed, whereon a decision is made that the amount of modification is great in the latter case, details of which are however omitted from this description.

At the step 58, the post-optimization intermediate code is reused. More specifically, the post-optimization intermediate code 30 recorded/updated in the i-th processing group 46 at the preceding compilation is used intact for the segment being processed without performing any processing in reality. By virtue of this feature, a significant reduction can be realized in the compilation processing as a whole.

At a step 408, the input intermediate code 403 for the segment being processed is read into a memory.

At a step 410, a flag 610 indicating the presence of the modification in the segment is set.

At a step 60, the preceding program transformation is reapplied to the intermediate code in the memory by making use of the program transformation information 20 recorded/updated in the preceding compilation. (Details of the reapplication of preceding program transformation 60 will be described hereinafter).

At the step 61, a decision is made as to whether or not the ratio of the numbers of times optimization is performed by reapplying the preceding program transformation (60) is sufficiently high. If the result of this decision step 61 is true, the step 414 is then executed, while if false, the step 412 is executed, where the optimization status number of the segment under consideration is set at "−1", which is then followed by execution of the steps 392, 45, 50 and 394 which are the processings involved in the initial compilation.

It is believed that the reference for the decision made at the step 61 as to the ratio of reapplication of optimization should lie within a range of 80% to 90% or higher, although no concrete reference value has been determined yet. To this end, a more appropriate decision can be realized by adopting a weighting method for taking into consideration the effect of reduction in the run time of the object code owing to the optimization and predicting accurately the influence on the run performance of the object program which has not undergone the optimization by accumulating the abovementioned weight from one to another processing group, in addition to the ratio of the number of optimization as reapplied, although details of such procedure are omitted from the description.

At the step 414, the intermediate code in the memory for the segment under consideration is written in as the post-optimization intermediate code 30.

At the step 416, the intermediate code modification ratio 612 is updated in correspondence to the increase in the numbers of the intermediate cotes with the modification mark as a result of reapplication of the preceding program transformation (60).

The description concerning the operations performed in the processing group 46 has now come to an end. Next, the processings involved in the intra-segment optimization 50 and the preceding program transformation reapplication 60 shown in FIG. 6 will be elucidated in more detail by reference to FIG. 7.

Figure 7:
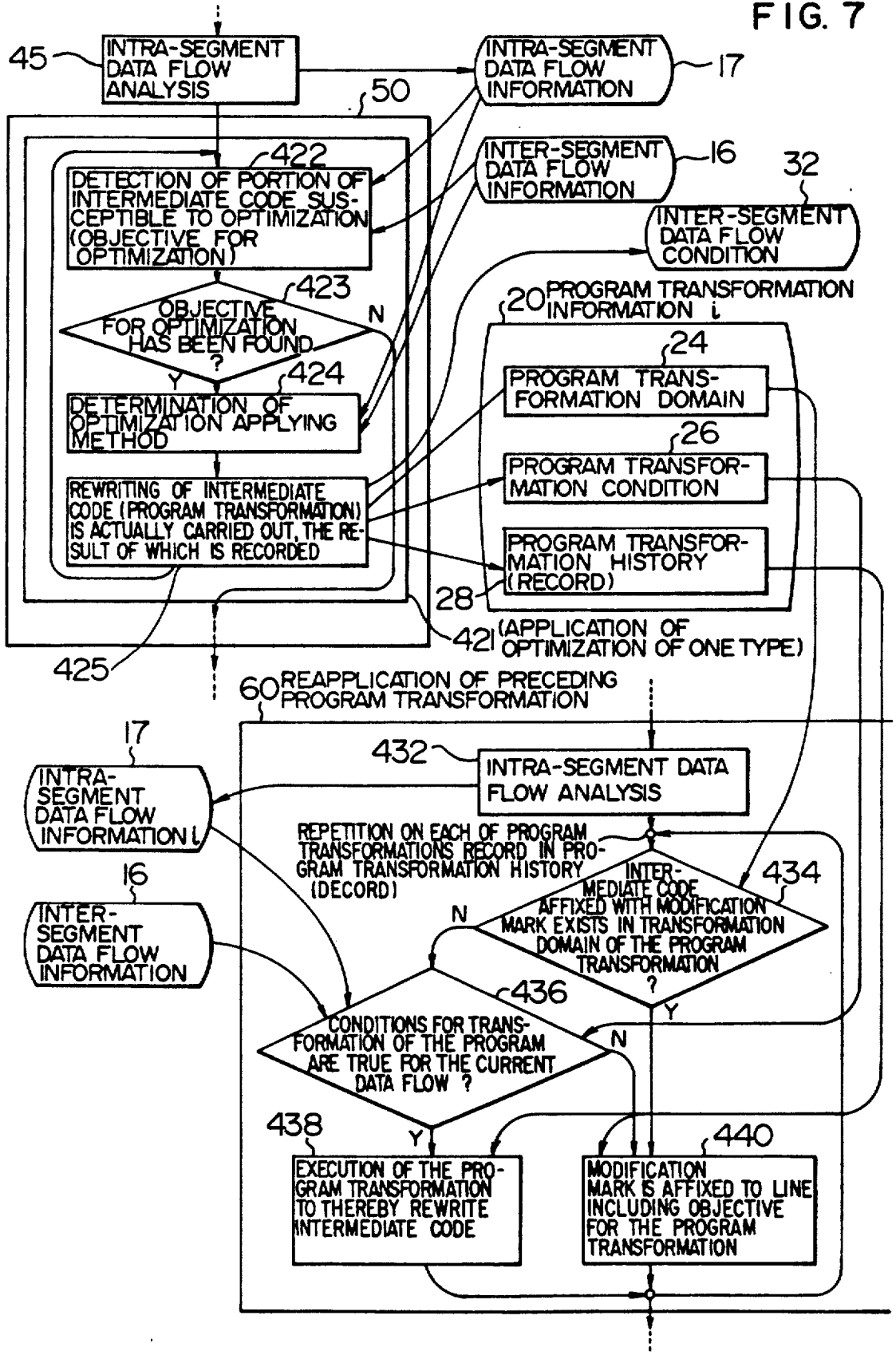
FIG. 7 is a flow chart for illustrating in detail processings involved in intra-segment optimization and reapplication of the preceding program transformation.

The flow chart portion shown in FIG. 7 on the left-hand side serves to illustrate in detail the intra-segment optimization processing 50 involved in the initial compilation performed within the processing group 46, and the flow chart portion shown on the right-hand side serves to illustrate in detail the preceding program transformation reapplication processing 60 included in the recompilation processing performed within the processing group 46. It should be noted that the program transformation information 20 is also shown in detail in FIG. 7. (Concerning the concrete content of the program transformation information 20, however, description will be made later on.)

In the first place, the processing in the initial compilation will be explained.

At the step 45, the intra-segment data flow analysis is performed, as mentioned previously, the result of which is recorded in the intra-segment data flow information 17.

The next processing is for the intra-segment optimization 50. In this conjunction, it should be noted that the intra-segment optimization 50 is separated into a variety of specific types of optimizations for application (421) such as, for example, copy propagation, common subexpression elimination, loop variant elimination and others. For separate application (421) of the specific types of optimizations, respectively, the processing including steps 422 to 425 is executed repeatedly.

At the step 422, the intermediate code to which the optimization can be applied (i.e. the objective for application of the optimization) is detected. More specifically, the intra-segment intermediate codes in the memory are retrieved to detect the portion of the intermediate code which can be subject to optimization processing with the aid of the intra-segment data flow information 17 and the inter-segment data flow information 16.

At the step 423, a decision is made as to whether or not the objective for optimization has been found. If this decision is true, the step 424 is then performed. Otherwise, the processing proceeds to the step 421 for the application of another type of optimization.

At the step 424, the optimization applying method is determined for the objective found at the step 422. In determination of the optimization applying method, the most appropriate one is selected of the basis of the intermediate codes located in the vicinity of the objective for optimization, the intra-segment data flow information 17 and the inter-segment data flow information 16.

At the step 425, the intermediate code is actually rewritten (i.e. program is transformed), the result of which is recorded. More specifically, such a domain of the program under consideration which may make it impossible to reapply the program transformation when the program is modified is recorded in the program transformation domain 24, the conditions for the data flow information which enables the application of the program transformation is recorded in the program transformation condition information 26, and the condition for the inter-segment data flow information which is one of the conditions for the program transformation is recorded in the inter-segment data flow condition information 32, whereon the species or type of optimization, the objective therefor and the application method thereof are recorded in the program transformation record (history) 28. Subsequently, the control is transferred back to the step 422, whereupon the processing described above is repeated.

Through the intra-segment optimization processing 50 described above, optimization is effectuated for the intra-segment intermediate codes in the memory. The information about the optimization carried out is recorded in the program transformation domain 24, program transformation condition information 26, program transformation record (history) 28 and the inter-segment data flow condition information 32.

Next, the description will be directed to the content of the preceding program transformation reapplication processing 60 which is the processing to be performed upon recompilation.

At the step 432, the intra-segment data flow analysis is performed, which is then followed by execution of the processing steps 434 to 440 for each of the program transformations recorded in the program transformation record (history) 28 for the segment of concern.

At the step 434, decision is made as to whether or not the intermediate code with the modification mark 70 is present in the program transformation domain of the program transformation being processed. When the result of the decision step 434 is true, the step 440 is executed. If it is false, then the step 436 is executed. In conjunction with this decision step 434, it is necessary to examine the intermediate codes on all the lines included in the program transformation domain 24 as to the presence of the modification mark. However, since the decision about the presence or absence of the modification mark requires only a little processing and since the number of lines included in the segment is usually only a few, the amount of processing is insignificant. If desired, the amount of processing may further be reduced by affixing the modification mark 70 not only to the intermediate code on a line basis but also to a basic block which is a set of the lines including the intermediate codes, although description of such procedure is omitted herein.

At the step 436, it is decided whether or not the program transformation condition 26 for the program transformation being currently executed is true for the current data flow information (i.e. the intra-segment data flow information 17 and the inter-segment data flow information 16). When the answer of this decision step 436 is true, the processing proceeds to the step 438, and otherwise (if false) to the step 440.

At the step 438, the program transformation is carried out for the intermediate codes in the memory to rewrite them.

At the step 440, those of the intermediate codes in the memory which belong to the lines including the objective for the program transformation have the modification mark 70 affixed thereto.

Thus, through the procedure described above, those of the program transformations recorded in the program transformation record (history) 28 which are reapplicable are reapplied while for those for which reapplication is unnecessary, the modification mark 70 is affixed to the intermediate codes on the lines including the objective for the program transformation.

In the above, the flows of the processings performed within the processing group have been described by reference to FIG. 7 in combination with FIG. 6.

Next, a description will be made of the contents of the optimization information 18 which is recorded/updated/used in the processing performed within the processing group 46 by reference to FIGS. 11A and 11B.

Figure 11A:
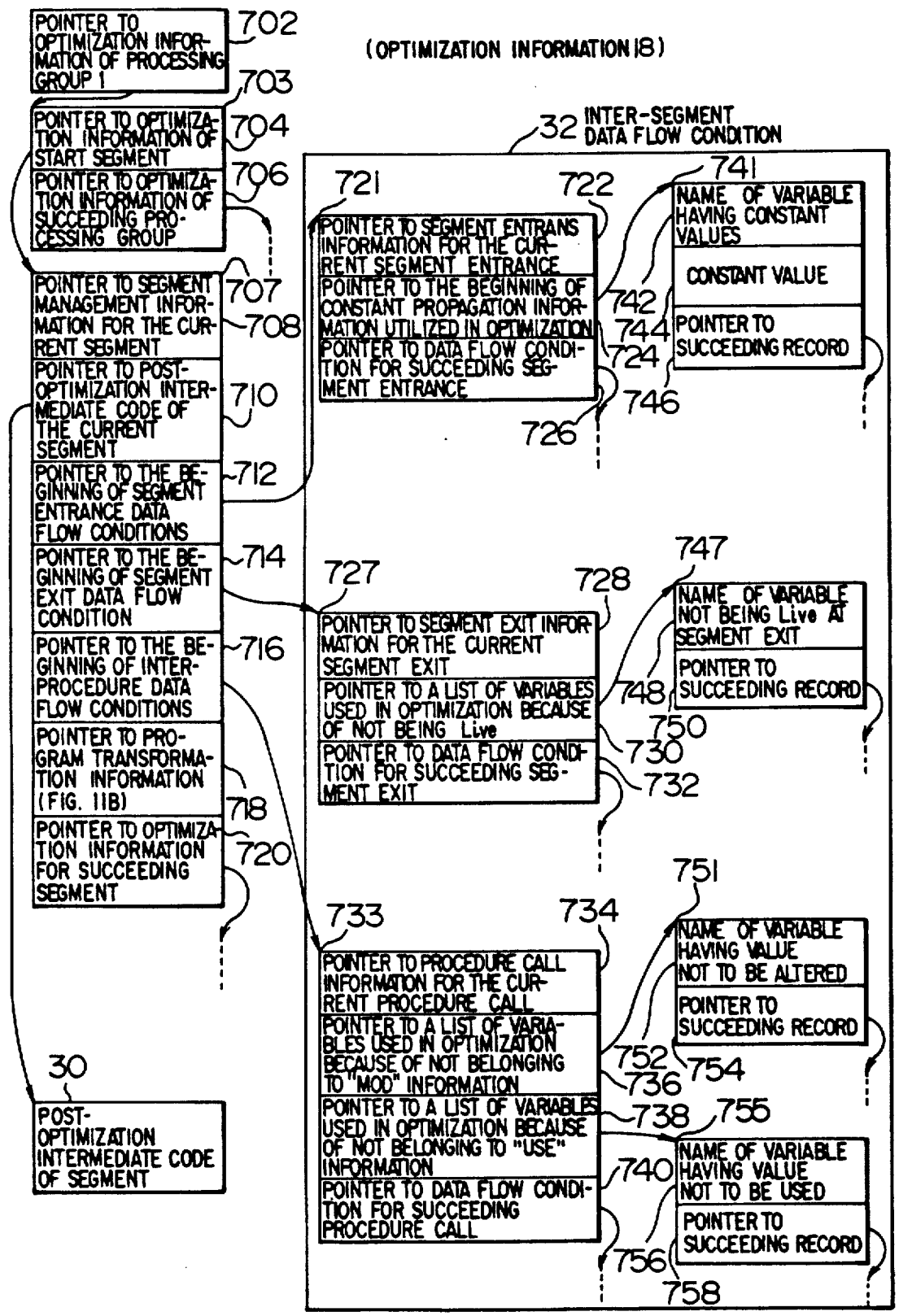
FIG. 11A is a view for illustrating inter-segment data flow conditions.
Figure 11B:
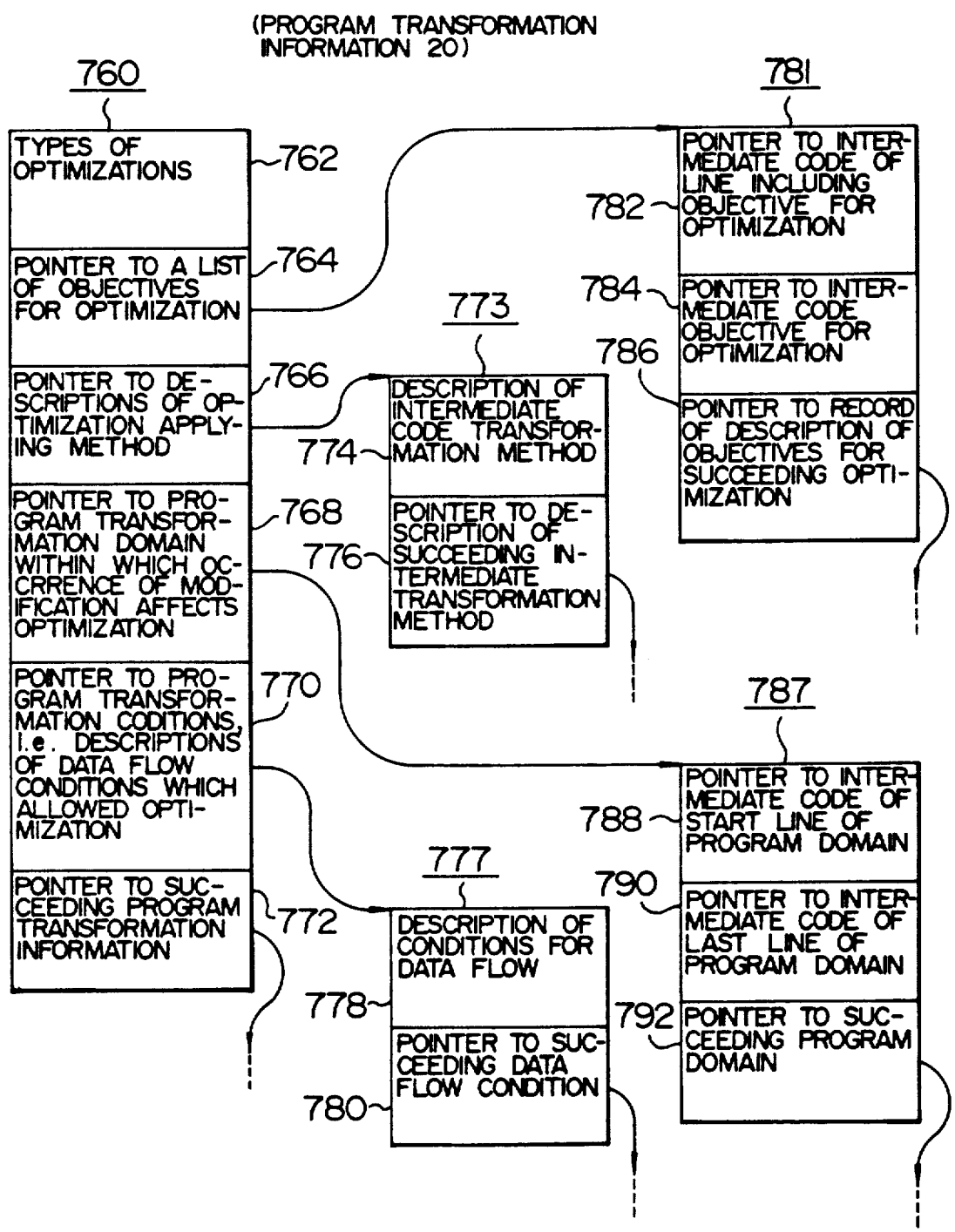
FIG. 11B is a view for illustrating contents of program transformation information.

FIG. 11A is a view for illustrating a structure of the optimization information 18 and FIG. 11B is a view for illustrating a structure of the program transformation information included in the optimization information.

First, reference is made to FIG. 11A. The optimization information 18 is referred to through the medium of a pointer 702 to the optimization information 703 of the first processing group 46, in which the optimization information 703 of the first processing group 46 includes a pointer 704 to the optimization information for the start segment and a pointer 706 to the optimization information for the succeeding processing group 46. The optimization information 707 for individual segments is linked through pointer 720 and holds data indicated at 708 to 720.

A reference numeral 708 denotes a pointer to the segment management information 603 for the segment corresponding to the information 707, and a numeral 710 denotes a pointer to the post-optimization intermediate code 30 included in the segment. Reference numerals 712 to 716 denote pointers to the inter-segment data flow conditions 32. More specifically, the reference numeral 712 denotes the pointer to the data flow condition 721 at the segment entrance, 714 denotes the pointer to the data flow condition 727 at the segment exit, and 716 denotes the pointer to the data flow condition 733 for the procedure call. A numeral 718 denotes a pointer to the program transformation information 20 (FIG. 11B) for the segment now under consideration, and 720 denotes a pointer to the optimization information for the succeeding segment.

The optimization information 18 is of the structure which allows each of the processing groups 46 and each of the segments to make reference to the optimization information 18, as outlined above.

The content of the inter-segment data flow condition 32 will be elucidated below.

The data flow condition for the entrance of a segment is to hold the property of having the constant values at the segment entrance in terms of the names 742 and the values 744 of the variables used in the optimization and includes as other information to this end a pointer 722 to the segment entrance information 621, a pointer 724 to the first record of the information 741 holding the variable names and the constant values each in a pair, a pointer 726 to the data flow condition 721 for the entrance of the succeeding segment and a pointer 746 to the succeeding record of the information 741 holding the variable names and the constant values in pairs.

On the other hand, the data flow condition for the exit of a segment is to hold the property of not being live at the exit of the segment in terms of the names 748 of the variables used in the optimization and includes as other information to this end a pointer 728 to the segment exit information 627, a pointer 30 to the first record of the information 747 holding the names 748 of the variables which are not live, a pointer 732 to the data flow condition 727 for the succeeding segment exit and a pointer 750 to the succeeding record of the information 747 holding the names 748 of the variables which are not live.

The data flow condition for the procedure call serves to hold the property of the values used in a given unaltered procedure call in terms of the names 752 of the variables used in the relevant optimization and at the same time the property of the values used in another given unaltered procedure call in terms of the names 756 used in the relevant optimization and includes as further information to this end a pointer 734 to the procedure call information 633, a pointer 736 to the first record of the information 751 holding the names 752 of variables of which values are not altered, a pointer 738 to the first record of the information 755 holding the names 752 of variables whose values are not to be used, a pointer 740 to the data flow condition 733 for the succeeding procedure call, a pointer 754 to the succeeding record of the information 751 holding the names 752 of the variables whose values are not altered, and a pointer 758 to the succeeding record of the information holding the names 756 of the variables of which values are not to be used.

The inter-segment data flow condition 32 can be expressed as outlined above. In order to decide whether or not the inter-segment condition 32 applies to the inter-segment data flow information 17, it is sufficient to decide whether or not the data flow information expressed by the inter-segment data flow conditions 32 can be derived from the inter-segment data flow information 17 without contradiction.

Next, reference is made to FIG. 11B which illustrates the program transformation information 20 for a given one of program transformations. A reference numeral 760 denotes records of one of the program transformation information 20. Of those records, a numeral 762 denotes the type of optimization, 764 denotes a pointer to a list of information 781 representative of the objectives for optimization, 766 denotes a pointer to a list of information 771 representing the optimization applying method, 768 denotes a pointer to a list of information 787 representing the program transformation domain, 770 denotes a pointer to a list of information 777 representing the program transformation conditions, and a reference numeral 772 denotes a pointer to the succeeding record of the program transformation information. The expression of the individual information in the form of list is for the purpose of allowing each of the information to be designated in a plurality.

The information 781 expressing the objective for optimization includes a pointer 782 to the intermediate code of the line including the objective for optimization, a pointer 784 to the intermediate code to be subjected to the optimization, and a pointer 786 to the succeeding record of the information 781 expressing the objectives for optimization.

The information 733 representing the optimization applying methods includes the information 774 describing a part of the intermediate transforming methods and a pointer 776 to a succeeding pointer of the information 733 representing the optimization applying methods.

The information 787 representing the program transformation domain 28 includes a pointer to the intermediate code of the start line in the program transformation domain and a pointer 792 to a succeeding record of the information 787 representing the program transformation domain.

The information 777 representing the conditions for the program transformation includes information 778 describing the conditions for the data flow information and a pointer 780 to a succeeding record of the information 777 representing the conditions for the program transformation.

The contents of the optimization information 18 are as described in the above.

The optimization information 18 is the information concerning the program transformation which has actually been carried out. There may however exist such applications in which recording of the information about the program transformation which could not be carried out is useful. By way of example, in the case of vector transformation processing, a great burden or load is imposed on the decision as to the possibility of vector transformation of a loop being analyzed. Accordingly, when it is previously known that a given loop is insusceptible to the vector transformation, the analysis of that given loop for the vector transformation is neglected for being unnecessary, whereby the optimization processing can significantly be reduced. The loop which could not undergo the vector transformation in the preceding compilation can not undergo the vector transformation equally upon recompilation because of absence of the modification in that loop, which in turn means that the analysis for the vector transformation is unnecessary. Thus, the optimization processing can significantly be reduced.

Further, the causes or factors providing an obstacle to the optimization in recording the information about the program transformation which could not be carried out should preferably be recorded as well for thereby reducing the optimization processing by detecting the presence of the modification in the program transformation domain. In that case, when the obstacle factor could not be eliminated even after the modification, the program transformation can be suppressed without need for analysis in detail. As another method of utilizing the optimization obstructing factor, the obstructing factor may be displayed to the user for helping him or her perform the turning of program.

The following description will be directed to the operating status of the processing group 46 and the content of the optimization program 18 by taking as an example the program shown in FIG. 12A, it being understood that the processing prior to the processing group 46 has already been described.

First, in the processing involved in the initial compilation, the intra-segment optimization 50 is executed for each of the segments. As a result of this, the optimization information 18 is generated and recorded.

In the first processing group, the intra-segment optimization 50 is executed for each of the segments of the intermediate codes 12 shown in FIG. 12B. As a result, the intermediate code 30 after the optimization is as shown in FIG. 16A. (It is however to be noted that the post-optimization intermediate codes 30 except that for the segment 1 are omitted from illustration.)

In the next processing group, the intra-segment optimization 50 is carried out for each of the segments of the post-optimization intermediate code 30. As a result, the intermediate code 30 after this optimization processing is as illustrated in FIG. 16B. (It is to be noted that the post-optimization intermediate codes 30 are omitted from illustration except the post-optimization code for the segment 1. In the following description, details of the optimization performed in the other processing groups 46 for other segments are omitted from the description.)

Figure 14:
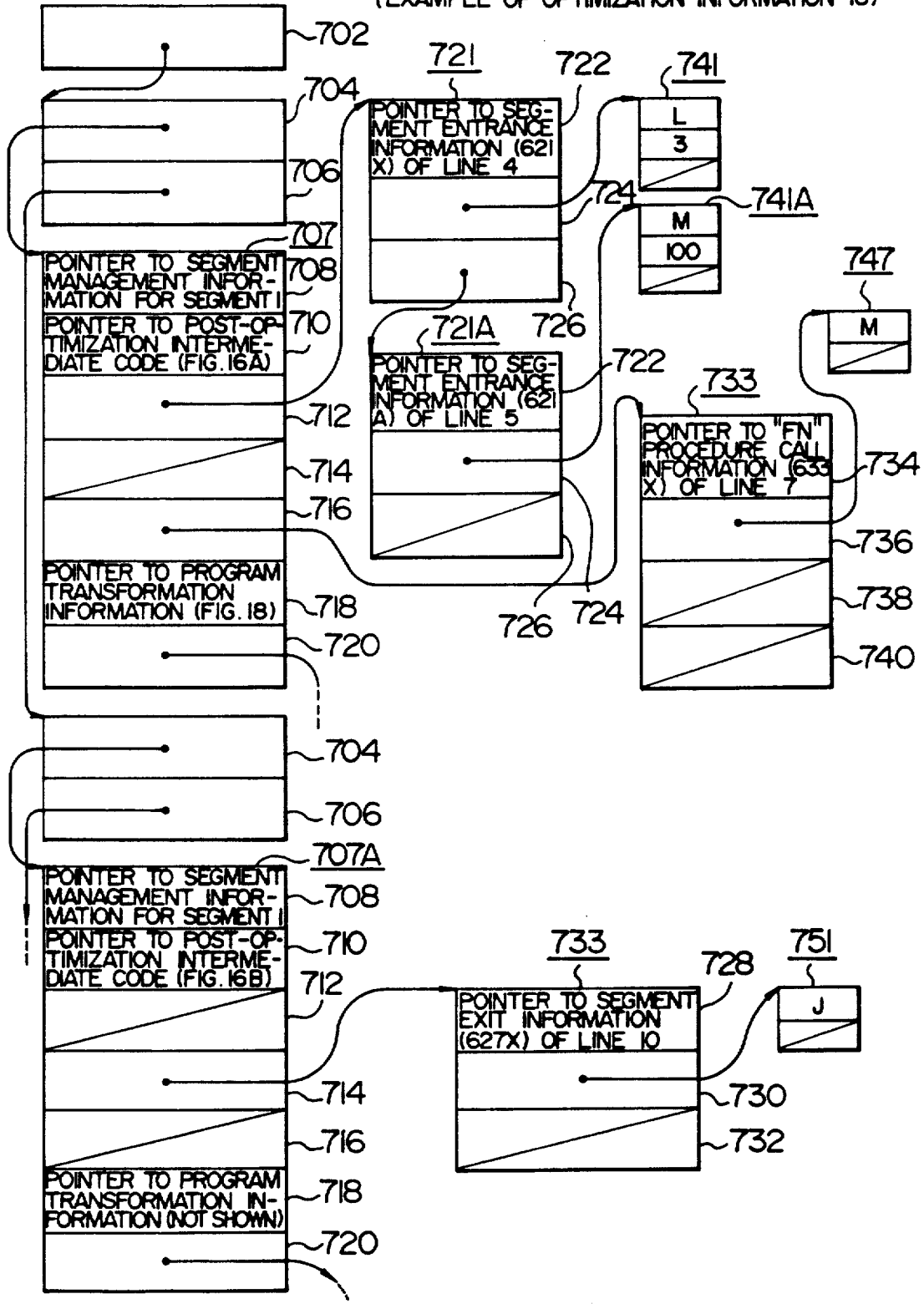
FIG. 14 is a view illustrating the inter-segment data flow conditions in an example of application of the invention.
Figure 15:
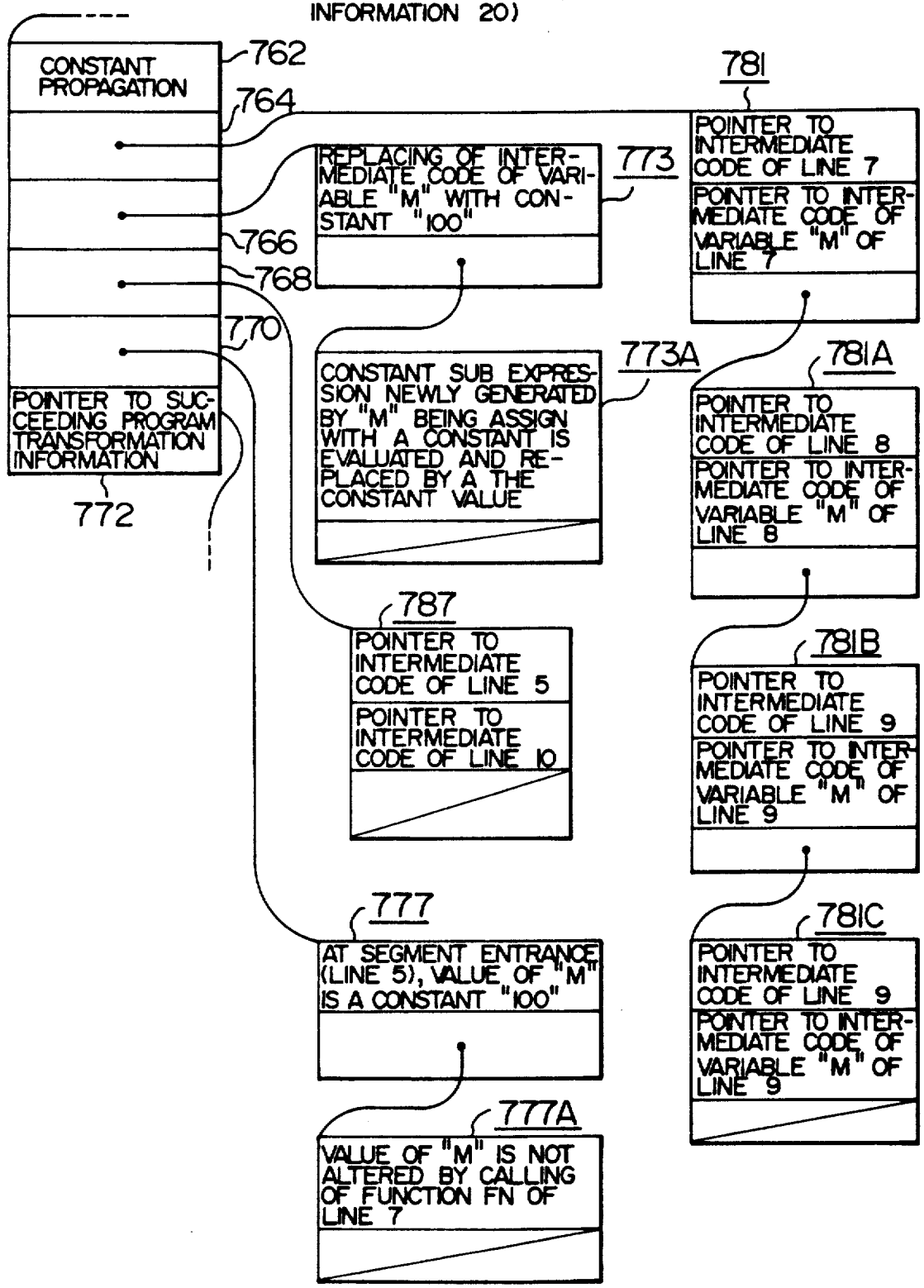
FIG. 15 shows the program transformation information in an example of application of the invention.

In conjunction with the optimization actually applied to the segment 1, the structures of the program transformation information 20 are shown in FIG. 21A (for the optimization performed in the first, processing group) and in FIG. 21B (for the optimization performed in the succeeding processing group). Information 802 concerning the reapplicability in the recompilation shown in these figures will be elucidated hereinafter. The optimization carried out within the first processing group includes (1) movement of both first and second expressions K * M * 4 on line 9 as the loop invariant outside of (immediately before) the loop D020, (2) reduction of the induction expression for the loop control variable J of the loop D020 and the expression including that variable, (3) constant propagation to a site for reference of the variable M which assumes a constant value of "100" without fail upon calling of the subroutine SUB1, and (4) constant propagation to a site for reference of the variable L assuming a constant value of "3" without fail upon calling of the subroutine SUB1. As a result of this, the intermediate code 12 of the segment 1 shown in FIG. 12B is transformed to the post-optimization intermediate code 30 of the segment 1 shown in FIG. 16A. The program transformation record or history 28 contained in the program transformation information 20 shown in FIGS. 21A and 21B describes in detail the processings described above. The program transformation domain 24 (i.e. the domain or range of the program in which the modification effects the reapplicability of the program transformation) extends over the whole of the loop D020 (from line 8 to line 10) in the abovementioned optimizations (1) and (2) performed for the loop D020, while in the abovementioned constant propagation (3) and (4), the program transformation domains 24 extend from the immediately preceding segment entrance to the line which is the destination for the constant propagation (from line 5 to line 8 and over line 41 respectively). The program transformation condition 26 (i.e. the data flow conditions necessary for the application of the program transformation) does not exist (this means that the transformation condition is true) for the abovementioned optimizations (1) and (2). For the abovementioned constant propagation (3), the condition of concern is that the variable M assumes the constant value of "100" at the segment entrance (line 5) and that the value of the variable M is not altered upon calling of the function FN on line 7. For the constant propagation (4) mentioned above, the condition is that the variable L is of the constant value of "3" at the segment entrance (line 4). Further, the inter-segment data flow condition 32 for the inter-segment data flow information 16 which is extracted from the program transformation conditions 26 mentioned above is that the variable L has the constant value of "100" at the segment entrance (line 5) and that the value of the variable M is not altered as a result of the call of the function FN on line 7. Information 721, 721A, 741, 741A, 731 and 747 shown in FIG. 14 serves to describe in concrete terms the inter-segment data flow conditions 32. More specifically, FIG. 14 shows the contents of the optimization information in the case of the instant exemplary application and in more concrete terms the optimization information 18 (information 707 and information shown at the right-hand side thereto) for the segment 1 in the first processing group and the optimization information 18 (information 707A and information shown at the right-hand side thereto). It should however be noted that the post-optimization intermediate code 30 is shown in FIGS. 16A and 16B, as described hereinbefore, while the program transformation information 20 is shown in FIG. 15 only in conjunction with the processing group 1. In particular, in FIG. 15 only the program transformation information corresponding to the constant propagation (3) mentioned hereinbefore is clearly illustrated. More specifically, the content of FIG. 15 shown in the format of FIG. 11B corresponds to only that of the program transformation information 20 shown in FIG. 21A which concerns the first constant propagation (3). Referring to FIG. 15, reference numerals 781, 781A, 781B and 781C denote the objectives for the program transformation, 773 and 773A denote a method of program transformation, 787 denotes the program transformation domain 24, and 777 and 777A denote the program transformation information 20.

In the intra-segment optimization 50 at the next processing group, the common subexpression elimination is carried out four times with the redundant code elimination being performed once, as is seen in FIG. 21B. The program transformation domain 24 for the common subexpression elimination extends from a location where the common subexpression first makes appearance at a location where the same occurs last. The program transformation domain for the redundant code elimination extends from the line to be detected to the segment exit. The program transformation condition 26 is absent (true) for the common subexpression elimination in the case of the instant example. For the redundant code elimination, the program transformation condition 26 is that the value of variable J at the segment exit (line 11) is not live. The inter-segment data flow condition 32 is that the value of the variable J is not live at the segment exit (line 11). In FIG. 14, the condition information is shown at 733 and 751.

FIG. 17 is a view summarizing in a list the inter-segment data flow conditions 32 for all the segments in all the processing groups. In the first processing group (i.e. the processing group 11, there are carried out the loop invariant move, the reduction of the induction expression, and the constant propagation. In the second processing group (i.e. the processing group 2), elimination of the common subexpression, copy propagation and the elimination of redundant code are performed. In the last processing group (i.e. the processing group 3), optimal register allocation is executed. In FIG. 17, there are also shown the inter-segment data flow condition 32 necessary for the reuse of the post-optimization intermediate codes 30 of the segments in the individual processing groups in the course of the optimization. Concerning the inter-segment data flow condition 32 for the segment 1 in the processing groups 1 and 2, description has already been made. Concerning the details of the contents of the inter-segment data flow conditions 32 for the other segments, however, illustration is omitted because of the necessity for describing the optimizations as performed.

Description has now been completed of the processings of the optimization information 18 recorded in the initial compilation by the processing groups 46 for the illustrated application.

Next, the processing involved in the recompilation performed in the processing groups 46 for the illustrated exemplary application will be described. The modification information shown in FIG. 18A is available upon recompilation. Additionally, the inter-procedure data flow information available upon recompilation is modified as shown in FIG. 18B. The modification information 4 shown in FIG. 18A indicates that in the preceding compilation, the user has made such modifications on the source program that a line "IF (K, E, L) GO TO 300" is added after the fifth line, a line "W1=B(1)" is added after the 22nd line, the 24th line is deleted, and the 27th line is replaced by a line "B(K)=G".

The corresponding updated intermediate code 12, splitting of the segments and optimization status numbers thereof are such as shown in FIG. 19, as described hereinbefore. In particular, for the segment 4, the optimization status number 608 is "0", indicating that the optimization must be redone from the beginning.

In correspondence to the changes in the inter-procedure data flow information 15, the intra-segment data flow information 17 has also been changed such that the variable N is no more the constant value at each segment entrance. Correspondingly, of the inter-segment data flow conditions 32 shown in FIG. 17, the condition for the segment 3 in the processing group 1 is false. More specifically, in the processing group 1, the value of the variable N is no more the constant value of "150" at the segment entrance (line 17) in the segment 3, as a result of which the inter-segment data flow condition 32 is false. Further, because the value of G is used after the exit of the segment due to an assignment statement "B[K * 4]=G" inserted in place of the line 27, the inter-segment data flow condition 32 for the segment 2 becomes false in the processing group 3. All the other inter-segment data flow conditions become true. More specifically, the values of the variables L and M remain unchanged in the recompilation. The remaining inter-segment data flow conditions 32 for the variables I, J, K, W1 and W2 to believe are also true, as can be ascertained by analyzing the intermediate codes 12 (FIG. 19) upon recompilation. Thus, the other inter-segment data flow conditions 32 are all true, as mentioned above.

FIG. 20 is a view for illustrating the processings involved in the recompilation.

At first, in the processing by the processing group 1, the preceding program transformation reapplication 60 is carried out for the segment 1 because it includes the intermediate code with the modification indicating mark 70 and because a flag 610 indicating the presence of modification is set, while for the segment 2, the use of the post-optimization intermediate code (58) is executed. For the segment 3, the preceding program transformation reapplication 60 is performed since the inter-segment data flow condition is false although absence of the modification. For the segment 4, the processings involved in the initial compilation is carried out because the optimization status number 608 is "0".

Next, the processings in the processing group 2 are performed as follows. For the segment 1, the preceding program transformation reapplication 60 is executed because the flag 610 indicating the presence of modification is in a set state. The processings of the initial compilation are performed after the optimization status number 608 has been set to "−1", because the modification is of significant influence and because the ratio of the program transformation reapplied by the preceding program transformation reapplication 60 does not become sufficiently high. For the segment 2, the post-optimization intermediate code reuse 58 is executed. For the segment 3, the preceding program transformation reapplication 60 is executed because the segment includes the intermediate code to which the modification mark 70 is affixed due to the processings by the processing group 1 and because the flag 610 indicating the presence of modification is set. For the segment 4, the processings for the initial compilation are performed because the optimization status number 608 is "0".

Processings in the processing group 3 are as follows. For the segment 1, the processings involved in the initial compilation are performed because of the optimization status number 608 being "−1". For the segment 2, the preceding program transformation reapplication 60 is performed because the inter-segment data low condition 32 is false regardless of the modification being absent. For the segment 3, the preceding program transformation reapplication 60 is performed because the flag 610 indicating the inclusion or presence of modification is set. For the segment 4, the processings of the initial compilation are performed because of the optimization status number 608 being "0".

For estimating the amount of the processings involved in the recompilation, calculation will be made on the assumption that the amount of processings in the initial compilation is represented by 1 (one), the amount of processing for the reapplication of the preceding program transformation (60) is 0.5, and that the amount of processing for the reuse of the post-optimization intermediate code is 0 (zero). The results of the calculation shows that the amount of processings in the recompilation is 2.0 (=0.5+0+0.5+1) in the processing group 1, 3.0 (=(0.5+1.0)+0+0.5+1.0) in the processing group 2, and 3.0 (=1.0+0.5+0.5+1.0) in the processing group 3. In total, the amount of processing is 8.0 (=2.0+3.0+3.0). In contrast, according to the conventional method in which the same processings as those in the initial compilation are also performed in the recompilation, the corresponding total amount of processing is 12.0 (=3 * 4.0), which means that, in the case of the exemplary embodiment of the invention described above, the amount of processings involved in the recompilation can be reduced in the recompilation is 2.0 the processing group 1, 3.0 by a factor of 2/3 (=8.0/12.0) when compared with the conventional method. Incidentally, it should be mentioned that in the case of the illustrated example of application, as many combinations of processing flows as possible are taken into consideration for having a better understanding of the processings for the recompilation so that the above-mentioned reduction in the amount of processings as a whole is estimated rather conservatively. In actuality, however, the amount of the processings in total can be reduced by a factor in a range of ⅓ to 1/10.

It should be understood that combinations of the program transformation domain 24 expressing the condition for the reapplicability of the program transformation and the program transformation conditions 26 are more or less arbitrary. By way of example, the condition for the reapplicability of the program transformation can be expressed simply by only the program transformation condition. In that case the amount of processing involved in the reapplicability decision is increased more or less. However, the possibility of the reapplication is increased because of enhanced accuracy of the reapplication, although the amount of processings for the reapplicability is increased. By way of example, the constant propagation of tho variable M in the program transformation shown in FIG. 21A could not be reapplied because of the presence of the intermediate code with the modification mark 70 following the fifth line. However, in practice, since the value of the variable M is not altered between the fifth line and the eighth line, the reapplication is possible by changing the condition for the decision of reapplicability. FIG. 22 is a view for illustrating determination for possibility or impossibility (i.e. permissibility) of the reapplication of the program transformation 21A and 21B of which reapplication permissibility 802 is "NO" (marked with "X") on the condition that the combination of the program transformation domain 24 and the program transformation condition 26 is changed. More specifically, in the case of the program transformation information 20, the program transformation domains 24 are omitted with the utilization of presence or absence of the program modification being given up, where the condition for the reapplicability is expressed only by the whole of the program transformation conditions 26. By virtue of such rearrangement, the reapplication permissibility 802 is "OK" (as marked with "O") except those which can not really be reapplied. In this manner, by changing or altering the combinations of the program transformation domains 24 and the program transformation conditions 26, the accuracy of decision for the reapplicability can be correspondingly changed. Since the influence of the modification differs considerably from one to another type of optimization, it is more effective to change the combination of the program transformation domain 24 and the program transformation condition 26 in dependence on the types of the programs.

Now description of the first embodiment of the invention has been completed.

In the case of the first embodiment, the object program 8 is not reused on a segment basis. It can however be understood that the object program 8 can also be reused on a segment basis by modifying the code generation processing 47 in such manner as illustrated in FIG. 8.

Next, a version of the first embodiment will be described.

Figure 8:
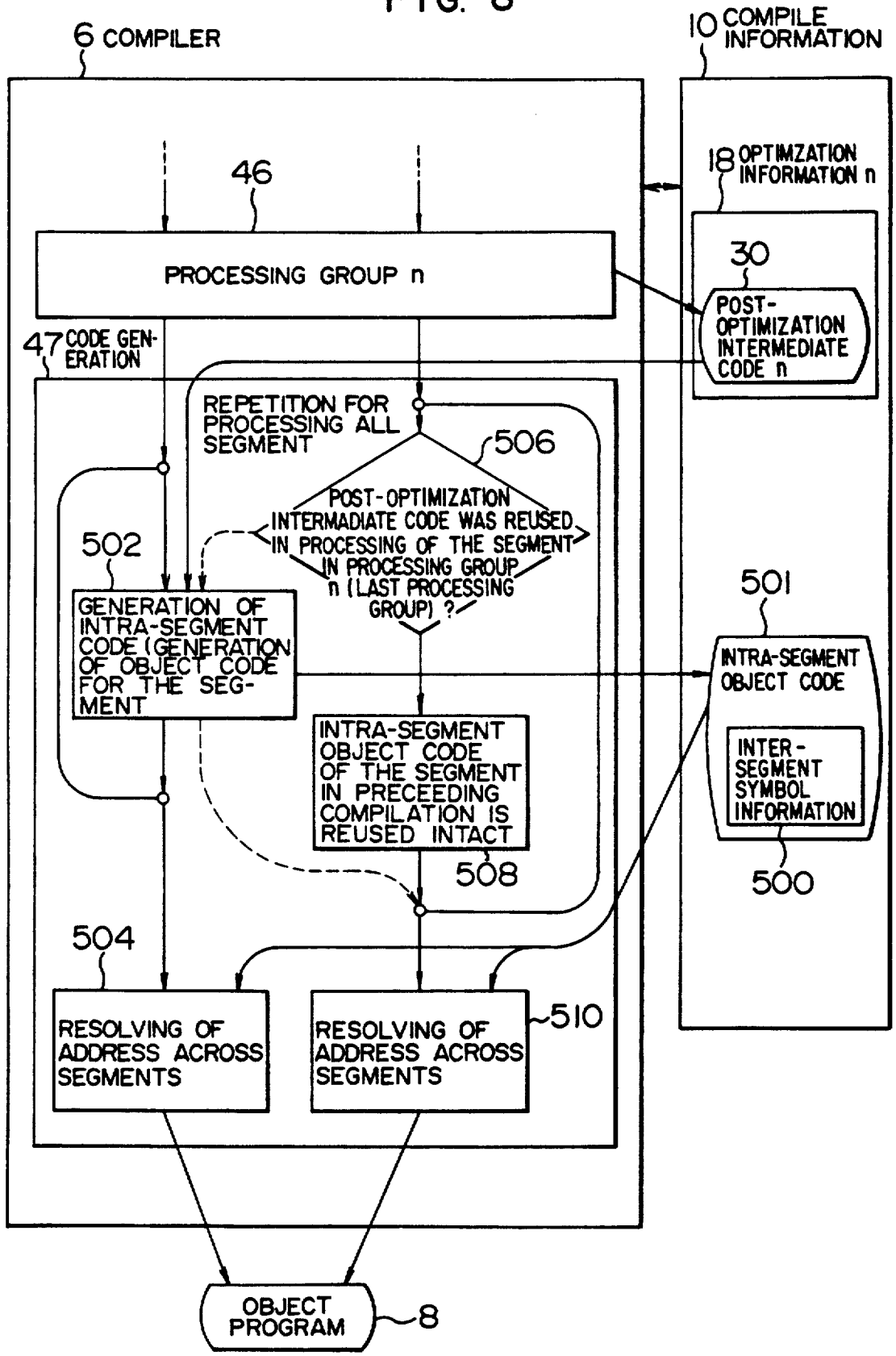
FIG. 8 is a diagram showing a structure of a code generating part for reusing the result of code generation.

Referring to FIG. 8, the intra-segment object code 501 constitutes a part of the object program generated for each of the segments. Through the code generation processing 47, the intra-segment object 501 is generated on a segment-by-segment basis to be reused. However, a portion which refers to the extra-segment address such as, for example, branch exteriorly of the segment remains unresolved and is registered as an inter-segment external symbol in inter-segment symbol information 500. For the object program 8, the address resolves of the inter-segment external symbols may be outputted to the intra-segment object codes 501 in all the segments. In this way, it is possible to generate the codes independently on a segment-by-segment basis, whereby the intra-segment generated code 501 can be reused for each of the segments.

Next, the description will turn to the flow of the code generation processing 47.

In the case of the initial compilation, the intra-segment code generation is performed for all the segments at a step 502 to thereby obtain the intra-segment generated codes 501. At a step 504 in the recompilation, the addresses across the segments are resolved to thereby output the object program. In the recompilation processing, the processings at steps 506 and 507 are executed for all the segments. At the step 506, it is decided whether or not the intermediate code reuse 58 has been made in the processing for the segments corresponding to the last processing group. When the answer of this decision step 506 is true, then the processing proceeds to a step 508, while if it is false, the processing proceeds to the step 502 in the initial compilation. At the step 508, the intra-segment object code 501 generated within the segment being processed is reused as it is, which means in reality that no processing is performed. In this way, the addresses across the segments are resolved for the intra-segment object codes 501 of all the segments to generate the object program 8.

As will be appreciated from the above description, by recording/reusing the intra-segment object code 501 on a segment basis, the code generation processing can be reduced, whereby the time taken for the compilation can be correspondingly shortened. (It is however to be added that the amount of the processing involved in the code generation 47 is considerably smaller when compared with that of the optimization processing and in reality is about 1/10 of the latter.)

Figure 24:
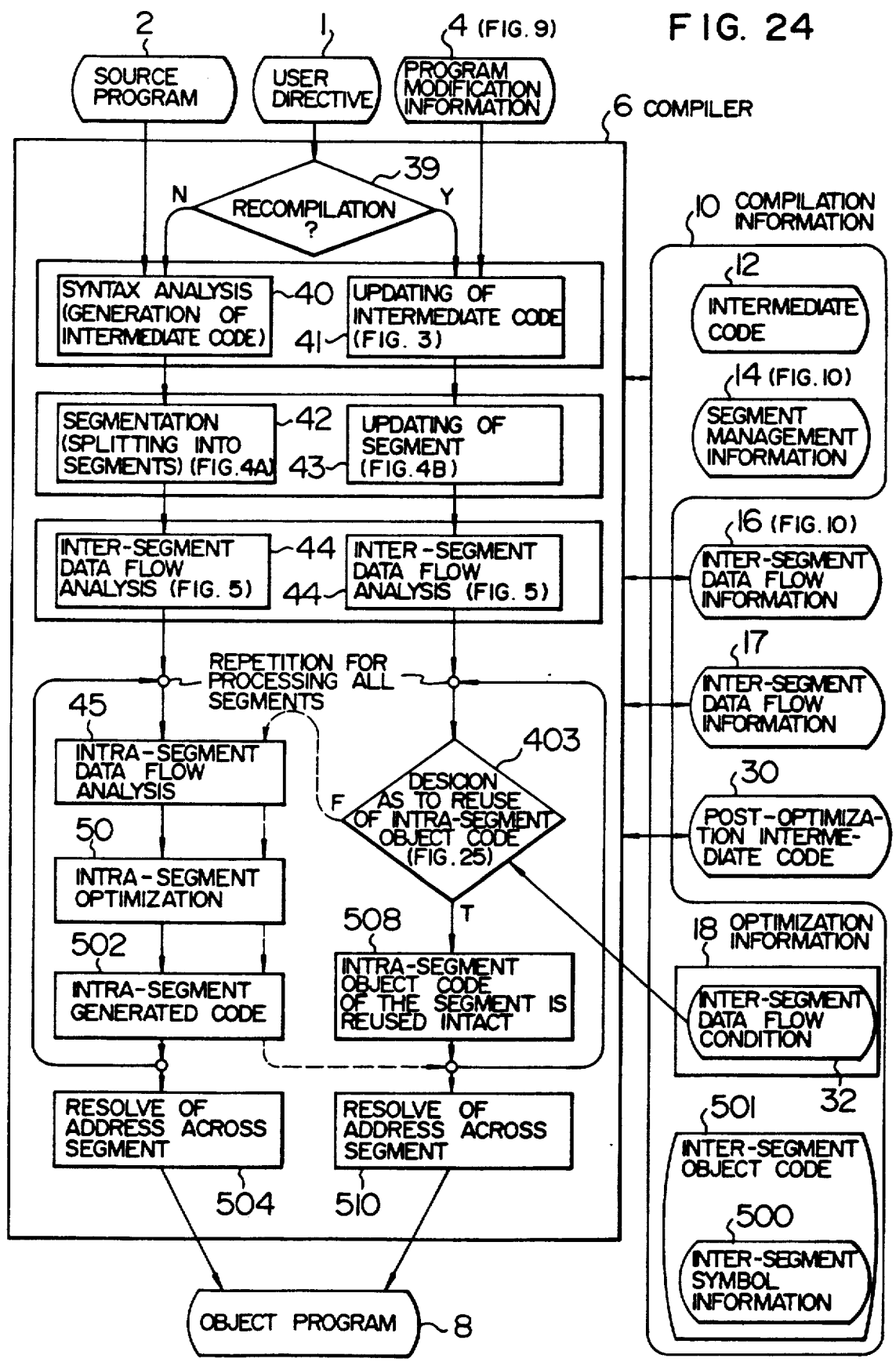
FIG. 24 shows a compiling method according to another exemplary embodiment of the invention.

In the implementation of the embodiments of the invention described in the foregoing, there are combined all the available processings, such as the splitting of the intermediate code 12 into segments (i.e. segmentation), the division of the optimization processing into the processing groups 46, the reuse 58 of the post-optimization intermediate code, the utilization of the inter-segment data flow information 17 in the intra-segment optimization processing 50, the reuse of the intra-segment object code 501 and others. It should however be understood that the optimization processing can be reduced by executing a combination of only some of the processings enumerated above. FIG. 24 shows still another exemplary embodiment of the present invention in which the segmentation of the intermediate code 12 is combined with the reuse of the intra-segment object code 501. In the case of the instant embodiment, the post-optimization code 30 is not reused and thus not included in the compilation information 10, but is generated and erased upon every compiling. The optimization information 18 contains only the inter-segment data flow conditions 32. Since the optimization processing is not divided into processing groups, there is available only one set of optimization information 18. A reference numeral 403 designates decision for reusing the intra-segment object code, which will be described in detail hereinafter. In FIG. 24, the structural components except those mentioned above have already been explained in conjunction with the other embodiments of the invention.

The control flow among the structural components is as follows. At first, in the initial compilation, the processing is performed in the same manner as in the case of the embodiment shown in FIG. 1 up to the inter-segment data flow analysis. In succession, however, the intra-segment data flow analysis 45, the intra-segment optimization 50 and the intra-segment code generation 502 are executed on a segment basis. Subsequently, the address across the segments is resolved at a step 504. In the recompilation, the processing up to the inter-segment data flow analysis 44 is the same as in the case of the embodiment shown in FIG. 1. Subsequently, the decision as to the reusability of the intra-segment object code is performed for each of the segments. If the answer of the decision is true, the control is transferred to a step 508 where the intra-segment object code 501 generated in the preceding compilation is reused intact. On the other hard, if the answer is false, the processings 45, 50 and 502 for the initial compilation are sequentially executed. Thereafter, the resolving step 504 for resolving the address across the segments is executed.

Figure 25:
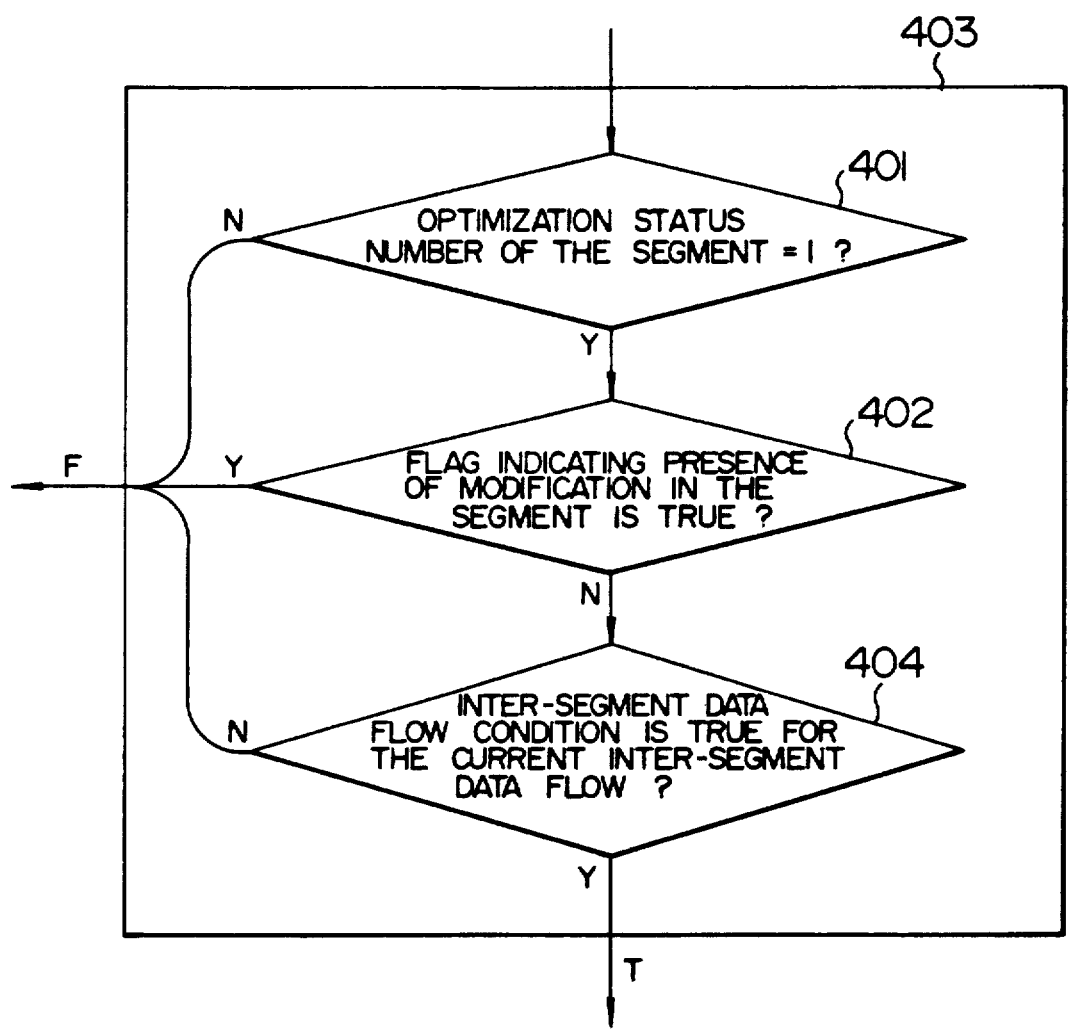
FIG. 25 is a view for illustrating in detail a decision processing (403) shown in FIG. 24.

The decision 403 as to the reusability of the intra-segment object code is performed in a manner illustrated in FIG. 25. Referring to the figure, the processing steps 401, 402 and 404 are same as those shown in FIG. 6 except for the flow of control. At the step 401, a decision is made as to whether the optimization status number is "1" or not. If it is true, the control is transferred to the step 402. If false, the result of the decision at the step 103 is made false, whereupon the processing comes to an end. At the step 402, it is decided whether or not the flag indicating the presence of modification in the segment is true. If it is false, the control is transferred to the step 404, while otherwise the result of the decision at the step 403 is made false, whereupon the processing comes to in end. At the step 404, it is decided whether or not inter-segment data flow condition 32 applies true to the current inter-segment data flow. If it is true, the result of the decision at 403 is made true, whereupon the processing comes to an end. If otherwise false), the result of the decision at 403 is made false to complete the processing.

In the case of the instant embodiment, the information to be held as the compiler information is of a much reduced amount, as the result of which the external memory equipment may be of a small capacity, which is an advantage.

Further, because the combined processing results of the intra-segment data flow analysis 45, the optimization 50 and the code generation 502 of the preceding compilation are reused in the recompilation, the amount of the processing can be reduced significantly. It is however noted that when compared with embodiment shown in FIG. 1, there is less chance for reusing the results of the preceding compilation when compared with the embodiment shown in FIG. 1, because the interim result of the optimization can not be reused. According to the instant embodiment, the compilation can be simplified. For further simplification, the optimization in which the inter-segment data flow information 16 is used may be spared. In that case, the inter-segment data flow analysis 44, the inter-segment data flow information 16, the inter-segment data flow condition 32 and the decision step 404 for the inter-segment data flow condition can be omitted, whereby the simplification is further enhanced. Further, the combination may be changed in dependence on the conditions as imposed. In other words, the present invention can be carried out in the most pertinent manner in consideration of the level of optimization, the amount of processing/effect/reapplicability on an average in each type of optimization, designation by the user, an average amount of modification of object program, frequency of the modification, the range affected by the modification, time required for the running of individual portions of the program, the ratio thereof and others.

As will now be appreciated from the foregoing description, it is possible according to the present invention to reuse effectively and efficiently a part of the original object codes or the intermediate codes generated in the course of optimization in the original compilation or the contents of the optimization processing, whereby the optimization processings can correspondingly be spared or omitted or saved to shorten the time taken for compilation, thereby to obtain very advantageous effects.

What is claimed is:

1. A program compiling method for transforming a first procedure included in a first source program into an object program, wherein said first source program is obtained by modifying a second source program including a second procedure corresponding to said first procedure and wherein the transformation is done by making use of a result of preceding compilation of said second procedure, said method comprising the steps, executed by an apparatus, of:

(a) compiling, when said second procedure is to be compiled into a second object program, a plurality of segments obtained by splitting said second procedure into corresponding portions, wherein the compiling step includes a series of program transformation processes for compilation;

(b) deciding, when said first procedure is to be compiled into a first corresponding object program, whether or not one portion (segment-corresponding portion) of said first procedure which corresponds to one of the segments of said second procedure satisfies a condition for reusability of a result of a program transformation process obtained for said one segment of said second procedure at said step (a) by executing at least a predetermined one of said series of the program transformation processes; and (c) reusing, when said one segment-corresponding portion satisfies said condition, said processing result in compilation of said one segment-corresponding portion.

2. A program compiling method according to claim 1,
    wherein said program transformation process result is one object program portion generated for said one segment of said second procedure at the compiling step (a), and wherein;
    said reusing step (c) includes the step of;
    (c1) outputting said one object program portion generated for said one segment of said second procedure as a result of compilation of said one segment-corresponding portion.

3. A program compiling method according to claim 2, wherein said condition includes a first condition that said one segment portion of said second procedure is included in said second procedure as the one corresponding segment portion without modification.

4. A program compiling method according to claim 3, wherein said condition further includes a second condition that modification of segments other than said one segment exerts no influence on compilation of said one segment-corresponding portion.

5. A program compiling method according to claim 4, wherein said decision step (b) includes the steps of:
    (b1) analyzing data flow between said one segment-corresponding portion and different segment-corresponding portions of said first procedure corresponding to plural segments other than said one segment of said first procedure; and
    (b2) deciding whether or not said second condition is satisfied on a basis of the said analyzed data flow.

6. A program compiling method according to claim 1, wherein said compiling step (a) includes the step of:
    automatically splitting said second procedure into said plurality of segments in such a manner in which each of said segments has a size lying between a predetermined upper limit and a predetermined lower limit and in which a loop included in said second procedure and having a size not greater than said lower limit value belong to a same segment.

7. A program compiling method according to claim 1, wherein said compiling step (a) includes the steps of:
    (a1) analyzing syntax of said second procedure to thereby output intermediate language codes;
    (a2) determining those portions of said intermediate language codes which are to belong to respective segments, respectively; and
    (a3) executing said series of the program transformation processes on each of the intermediate language portion.

8. A program compiling method according to claim 1, wherein said decision step (b) includes the steps of:
    (b1) detecting modification information added to said first procedure of a plurality of modified portions and indicating discriminatively addition, deletion or correction as well as a content of the addition or the correction, thereby updating intermediate language code portions corresponding to said modified portions, respectively, on a basis of said modification information; and
    (b2) making decision as to whether or not said condition is satisfied by using the updated plurality of intermediate language code portions.

9. A program compiling method according to claim 1,
    wherein said series of program transformation processes include groups of partial optimization processes;
    wherein said decision step (b) includes the step of:
    deciding whether or not said one segment-corresponding portion satisfies each of reusability conditions each defined for one group of said partial optimization process groups, each of said reusability conditions being a condition for allowing reuse of one of said plurality of the intermediate language code portions, which is obtained by executing one group of said partial optimization process groups at said compiling step (a); and
    wherein said reusing step (c) includes a step of:
    reusing, for compilation of said one segment corresponding portion, one intermediate language code portion obtained by executing, at said compiling step (a), one group of said partial optimization process groups, when said one segment-corresponding portion satisfies one condition defined for the one segment for said one group among the reusability conditions.

10. A program compiling method according to claim 9, further comprising the steps of:
    (d) storing, at application of each partial optimization process of each partial optimization process group to each of said segments at said compiling step (a), information indicative of an objective within the segment to which the application is within executed; a condition for the application to be allowed and a method for the application to be executed;

(e) deciding when said one segment-corresponding portion fails in satisfying a reusability condition corresponding to a succeeding partial optimization process group to be executed in succession to said one partial optimization process group, whether or not said one segment-corresponding portion satisfies a condition for application of each partial optimization process of said succeeding partial optimization process to the one segment group based upon information stored for the one segment for application of the partial optimization process; and (f) applying, when a condition which is indicated by information stored for said one segment, for application of one partial optimization process of said succeeding partial optimization process group is satisfied by said one segment-corresponding portion, said one partial optimization process to a portion within said one segment-corresponding portion corresponding to an objective within the one segment indicated by the information said one partial optimization process, in accordance with a method indicated by the information.

11. A program compiling method according to claim 10, further comprising the steps of:

(g) invalidating, a result of applying said partial optimization process to a portion within said one segment-corresponding portion, thereby allowing said succeeding partial optimization process group to be executed for said one intermediate language code when said one segment-corresponding portion fails in satisfying condition for application of a number of partial optimization processes of said succeeding partial optimization process group a ratio of which to a total number of partial optimization processes of the succeeding partial optimization process group, exceeds a predetermined ratio.

12. A program compiling method, for transforming a first source program obtained by modifying a second source program, to an object program by making use of a result of previous compilation of said second source program, comprising the steps executed by an apparatus, of:

(a) deciding at a time when said first source program is to be compiled, whether or not said first source program satisfies conditions for reusability respectively defined at least for some of a partial optimization processes included in an optimization process executed upon the previous compiling of said second source program, said reusability conditions being defined respectively for reusing intermediate language codes each obtained upon execution of each of said some partial optimization processes onto said second source program; and (b) reusing, when said first source program satisfies a reusability condition corresponding to one of said some partial optimization processes, an intermediate language code obtained as a result of execution of said one partial optimization process upon compilation of said second source program without executing said one partial optimization process onto said first source program.

13. A program compiling method according to claim 12, wherein the first program comprises a first procedure corresponding to a second procedure included in said second source program and composed of one of a main program, a subroutine and a function wherein the method further comprises the steps of:

(c) splitting the second procedure into segments, upon compilation of said second source program; and (d) executing said partial optimization processes to each of said segments;

wherein each of said decision step (a) and said reuse step (b) is executed for each of portions corresponding to the segments of the second procedure, within said first procedure.

14. A program compiling method, for transforming a first source program obtained by modifying a second source program, to an object program by making use of a result of compilation of said second source program, comprising steps executed by an apparatus, of:

(a) storing, upon compiling of said second source, information indicative of a type of at least one of a plurality of partial optimization processes constituting an optimization process applied to said second source program to optimize said second source program, a portion within the second procedure to which the one partial optimization process has been applied and source information of how application thereof has been executed;

(b) deciding, while compiling of said first source program, whether one partial optimization process having a type indicated by the stored information can be applied to a portion of said first source program corresponding to said portion within the second program indicated by the stored information in accordance with said process information; and (c) in response to if said one partial optimization can be applied to said portion of said first source program, applying said one partial optimization process to said corresponding portion of said first source program according to the indicated.

15. A program compiling method according to claim 14, further comprising the step of:

(d) storing a condition satisfied by said second source program and allowing the one partial optimization process said to be applied to said portion of said second source program, upon compiling thereof;

wherein said decision step (b) includes the step of deciding the applicability of said one partial optimization processing, depending upon whether or not said first source program satisfies said stored condition.

16. A program compiling method according to claim 14, further comprising the steps of:

(d) storing upon compiling of said second source program, information indicative of a program portion (a program transformation domain) which includes a portion located in a vicinity of said portion of said second source program, said program transformation domain being a portion affecting decision as to applicability of said one partial optimization process to said portion of said second program and being determined in dependence on a type said one partial optimization process;

wherein said decision step (b) includes the step of deciding whether or not said one partial optimization process can be applied to the corresponding portion of said first source program, on a basis of a portion of said first source program corresponding to a program transformation domain indicated by the stored information.

17. A program compiling method according to claim 16, wherein said decision step (b) includes the step of:

deciding applicability of said one partial optimization process to said first source program, depending upon whether or not the portion of the first source program corresponding to said program transformation domain of the second program satisfies a condition that said program transformation domain is included in said first source program without modification and that all other partial optimization processes applied to a program portion of said second source program including at least a part of said program transformation domain prior to execution of said one partial optimization process are decided to be applicable to said first source program.

18. A program compiling method according to claim 17, further comprising the steps of:

(e) sequentially executing said decision step (b) to different partial optimization processes; and (f) affixing, when a selected one of said different partial optimization processes is decided not to be applicable as a result of execution of said decision step (b), a mark indicating presence of modification to a portion in said first program which corresponds to a portion indicated by information stored for said selected one partial optimization process, said mark being same as a mark affixed to a modified portion included in said first program;

wherein the decision step (b) includes the steps of:

deciding, at deciding applicability of one of said partial optimization processes, whether or not the first source program satisfies a condition for nonmodification that the first source program included in said first source program, depending upon whether or not said mark indicating the presence of modification is affixed to a portion in said first source program which corresponds to a program transformation domain of said second source program, related to the one partial optimization process.

19. A program compiling method according to claim 17, further comprising the steps of:

(d) storing a part of plural conditions satisfied by said second source program for application of one partial optimization process to said second source program, upon compiling thereof;

(e) storing, upon compiling of said second source program, a program portion (condition-corresponding program transformation domain) which includes a portion located in a vicinity of an objective portion of said second source program to which portion the one partial optimization process has been applied and affects decision as to whether or not said first source program satisfies said part of the conditions, said condition-corresponding program transformation domain being determined in dependence on a type of said one partial optimization process and said part of the conditions; and wherein said decision step (b) includes the step of deciding whether said one partial optimization process can be applied or not, depending upon whether or not said first source program satisfies the conditions except said part of the conditions and whether or not a portion in said first source program which corresponds to said condition-corresponding program transformation domain satisfies said condition for nonmodification.

20. A program compiling method according to claim 16, further comprising the steps of:

(e) splitting into segments, a second procedure included in said second source program and composed of one of a main program, a subroutine and a function, upon compilation of said second source program; and (f) executing said partial optimization processes for each of said segments at compilation of said second source program;

wherein said steps (a) to (d) are executed for each of portions respectively corresponding to the segments of the second procedure, within said first procedure of said first source program.

* * * * *